United States Patent
Rojas García et al.

(10) Patent No.: US 8,883,927 B2
(45) Date of Patent: Nov. 11, 2014

(54) RADIAL MULTI-BLOCK COPOLYMERS

(75) Inventors: José Manuel Rojas García, Benito Juárez (MX); Gerardo Gutiérrez Cruz, Toluca (MX); Norma Alicia Hernández Beltrán, Toluca (MX)

(73) Assignee: Dynasol Elastómeros, S.A. de C.V., Altamira (MX)

( * ) Notice: Subject to any disclaimer, the term of this patent is extended or adjusted under 35 U.S.C. 154(b) by 430 days.

(21) Appl. No.: 12/313,844

(22) Filed: Nov. 25, 2008

(65) Prior Publication Data

US 2009/0137704 A1 May 28, 2009

Related U.S. Application Data

(60) Provisional application No. 60/990,705, filed on Nov. 28, 2007.

(51) Int. Cl.
| | |
|---|---|
| *C08F 297/00* | (2006.01) |
| *C08L 53/00* | (2006.01) |
| *C08L 95/00* | (2006.01) |
| *C08F 297/04* | (2006.01) |
| *C09J 153/02* | (2006.01) |
| *C08L 53/02* | (2006.01) |

(52) U.S. Cl.
CPC .......... *C08F 297/04* (2013.01); *C08F 297/044* (2013.01); *C09J 153/02* (2013.01); *C08L 53/02* (2013.01); *Y10S 525/901* (2013.01)
USPC ............. 525/250; 525/98; 525/249; 525/314; 525/332.9; 525/901

(58) Field of Classification Search
USPC .......... 525/98, 250, 316, 326.1, 331.9, 332.9, 525/333.3, 366, 901, 249, 314
See application file for complete search history.

(56) References Cited

U.S. PATENT DOCUMENTS

| | | | |
|---|---|---|---|
| 3,281,383 A | | 10/1966 | Zelinski et al. |
| 3,716,495 A | * | 2/1973 | Hsieh ............................ 502/153 |
| 4,075,186 A | | 2/1978 | Ambrose et al. |
| 4,104,332 A | * | 8/1978 | Zelinski .................... 525/332.9 |
| 4,503,188 A | | 3/1985 | Mancinelli |
| 4,708,990 A | * | 11/1987 | Wong et al. .................... 525/250 |
| 5,159,022 A | | 10/1992 | Ikematu et al. |
| 5,397,841 A | | 3/1995 | DuBois et al. |
| 5,554,697 A | | 9/1996 | Van Dijk et al. |
| H1730 H | | 5/1998 | Sutherland |
| 5,948,527 A | | 9/1999 | Gerard et al. |
| 6,300,441 B1 | | 10/2001 | Schade et al. |
| 6,350,834 B1 | | 2/2002 | Schade et al. |
| 6,353,056 B1 | | 3/2002 | Knoll et al. |
| 6,391,981 B1 | | 5/2002 | Willis et al. |
| 6,444,767 B1 | | 9/2002 | Schade et al. |
| 6,686,423 B1 | | 2/2004 | Desbois et al. |
| 7,009,000 B2 | | 3/2006 | Bening et al. |
| 7,101,941 B2 | | 9/2006 | Desbois et al. |
| 7,125,940 B2 | | 10/2006 | Willis |
| 7,189,792 B2 | | 3/2007 | Halasa et al. |
| 7,223,816 B2 | | 5/2007 | Handlin, Jr. et al. |
| 2005/0027071 A1 | | 2/2005 | Deeter et al. |
| 2007/0225427 A1 | | 9/2007 | Wright et al. |

OTHER PUBLICATIONS

Ménoret, S. et al. "Retarded Anionic Polymerization: Influence of the Structure of Dialkylmagnesium Additives on the Reactivity of Polystyryllithium species" Macromolecular Chemistry and Physics vol. 202 (2001) pp. 3219-3227 available online Nov. 2, 2001.*
International Search Report and Written Opinion mailed Mar. 19, 2009 for a PCT International Application No. PCT/IB2008/003270 corresponding to the present U.S. Appl. No. 12/313,844.

* cited by examiner

*Primary Examiner* — Irina S Zemel
*Assistant Examiner* — Jeffrey Lenihan
(74) *Attorney, Agent, or Firm* — Stephen S. Hodgson

(57) ABSTRACT

A process for making a radial multi-block copolymer, comprising:
  (a) anionically polymerizing styrene monomer $A_1$, at least one monovinylarene monomer $A_2$ other than styrene and at least one conjugated diene monomer B using a lithium-based initiator to form block copolymer chains;
  (b) adding a metal alkyl compound other than the lithium-based initiator after initiating anionic polymerization in step (a), wherein the molar ratio of the metal alkyl compound to lithium is greater than about 2.0; and
  (c) adding a coupling agent having more than two functional groups to form the radial multi-block copolymer, wherein the radial multi-block copolymer comprises a residue Z derived from the coupling agent and block copolymer chains from step (b) coupled to the residue Z.

47 Claims, No Drawings

US 8,883,927 B2

RADIAL MULTI-BLOCK COPOLYMERS

CROSS REFERENCE TO RELATED APPLICATION

Priority is claimed to U.S. Provisional Patent Application Ser. No. 60/990,705 filed by the inventors on Nov. 28, 2007, which is incorporated by reference.

BACKGROUND OF THE INVENTION

1. Field of the Invention

The present invention pertains to block copolymers of vinyl aromatic and conjugated diene monomers, and more particularly to coupling block copolymers together to form multi-block copolymers.

2. Description of the Related Art

The anionic polymerization technique to produce block copolymers is a well known process in the state of the art, and it is one of the more versatile techniques for the preparation of very well-defined block copolymers with narrow molecular weight distributions and with well-defined architectures and compositions. An interesting advantage of the anionic polymerization technique is the living nature of the polymer chains after consuming the added monomer. This advantage allows one to prepare sequentially perfect block copolymers, which retain the living nature at the end of a polymer chain. The living block polymer can be terminated by addition of an electrophilic compound or a proton donor compound such as carbon dioxide, oxygen, water, alcohols, mercaptans, and primary and secondary amines as described in U.S. Pat. No. 2,975,160. However, other types of terminating agents are coupling agents to form coupled copolymers having at least two branches in which they condense two or more living block copolymers into their molecule. For example, if two living linear block polymers are condensed into a coupling agent, the copolymer is a linear triblock copolymer, and if the final block copolymer has more than five arms or branches, it is called a radial block copolymer.

Radial block copolymers have many advantages over other types of copolymers in some specific applications, such as pressure-sensitive adhesives (PSA), engineering plastics, and polymer-modified asphalts (PMA). In pressure-sensitive adhesives, the use of a radial block copolymer can significantly increase the mechanical and adhesive properties of the PSA. Similar advantages are allowed if radial block copolymer is used to modify asphalt, because the mechanical and rheological properties of the asphalt are enhanced, and also the temperature susceptibility of PMA is reduced. Radial block copolymer can be used as a modifier for engineering plastics to improve the mechanical properties, such as impact resistance and tensile strength, of the plastics. However, if radial block copolymers are used, a large increase in the viscosity of the composite (i.e. PSA or PMA) has been observed in the past due to the effect of the number of arms, especially if it is greater than five arms. Therefore, viscosity is a key variable for processes where radial block copolymers are used to prepare adhesives, polymer-modified asphalts, and engineering plastic composites.

Bening et al. in U.S. Pat. No. 7,009,000, which is incorporated by reference, disclosed that by controlling the number of arms between 2 and 4 and decreasing the number of arms higher than 5 by using a metal alkyl compound, the viscosity of radial block copolymers can be held in an acceptable range. However, the resulting performance of PSA, PMA and engineering plastics is not good enough for certain applications.

Coupling efficiency depends on the type and amount of coupling agent, reaction medium (type of solvent), reactive terminal carbanion, and temperature. If coupling agent is added at an elevated temperature, terminating reactions compete with coupling reactions, and therefore, the coupling efficiency for a certain coupling agent is also decreased. Ambrose et al. in U.S. Pat. No. 4,075,186 disclosed that substituted polyacrylates can be used as a grafting agent to produce graft copolymers of polybutadiene and substituted polyacrylates with a coupling efficiency around 30-65%. Mancinelli in U.S. Pat. No. 4,503,188 disclosed that a multi-ester coupling agent can produce star block copolymers having a coupling efficiency of about 65%, according to examples therein. DuBois et al. in U.S. Pat. No. 5,397,841 disclosed that alkylmethacrylates can be used as coupling agents in anionic polymerization for producing grafted polymers, but coupling efficiency is around 80-90% for polystyrene, around 50-60% for polyisoprene and isoprene-styrene copolymers, and around 45% for styrene-butadiene copolymers. Deeter et al. in U.S. Patent Application Pub. No. 2005/0027071 A1, which was published Feb. 3, 2005, and which is incorporated by reference for all purposes, disclosed in their examples that coupling efficiency is no more than 60% because of the competition between terminating and coupling reactions when polyesters, polyacrylates, polymethacrylates or polyketones are used as coupling agents of styrene-butadiene copolymers in a solution anionic polymerization process.

Metal alkyl compounds may be used in an anionic polymerization process for several different applications. For example, Schade et al. in U.S. Pat. Nos. 6,300,441, 6,350,834, and 6,444,767; and Knoll et al. in U.S. Pat. No. 6,353,056 disclosed new initiator compositions using metal alkyl compounds as anionic polymerization retardant agents for producing anionic polymers. Willis et al., U.S. Pat. No. 6,391,981, disclosed that metal alkyl compounds are used to decrease the viscosity of the polymer cement. Desbois et al. in U.S. Pat. No. 6,686,423 disclosed that mixtures of metal alkyl compounds are better polymerization retardant agents than a single metal alkyl compound. Bening et al. in U.S. Pat. No. 7,009,000 disclosed that metal alkyl compounds increase the coupling efficiency when any di-ester compound is used as a coupling agent. Halasa et al. in U.S. Pat. No. 7,189,792, disclosed that organoaluminum compounds may be used as part of a new catalytic system to produce high 1,4-trans polybutadienes; and Willis in U.S. Pat. No. 7,125,940 disclosed that metal alkyl compounds can be used to control the microstructure of the polydiene part of block copolymers.

Polyesters, polyacrylates, polymethacrylates and polyketones compounds, when used as coupling agents, produce yellowness in the polymer cement and in the porous pellet product. Yellowness is an undesirable characteristic in many applications, such as in pressure-sensitive adhesives.

SUMMARY OF THE INVENTION

The present invention relates to a technique for producing gel-free radial multi-block copolymers without yellowness in a radial multi-block copolymer cement (cement in this invention is the radial multi-block copolymer in solution after reacting the monomers), and in a porous pellet product, and also showing good control of viscosity when the radial multi-block copolymer is used in adhesive formulations, engineering plastic compounding, and polymer-modified asphalt compositions. The present invention also relates to a process to produce radial multi-block copolymers, in which a substantial portion has at least five arms, by using anionic polymerization wherein the control on viscosity is reached by the balance of styrene monomer and another type of monovinylarene monomer, and by the ratio of alkyl metal compound to molar activated-lithium that is used. More specifically, it relates to a process to prepare radial multi-block copolymers wherein a coupling agent is selected from polyesters, polyacrylates, polymethacrylates, and polyketones compounds. More particularly, it relates to a process wherein at least one metal alkyl compound is used to prepare the radial multi-block copolymers as an anti-yellowness agent and as a coupling promoter for both radial multi-block copolymer cement and porous pellet product. The present invention further relates to some specific applications showing good control on viscosity, including but not limited to, pressure-sensitive adhesives, engineering plastics, and polymer-modified asphalts.

The present invention provides in one embodiment the following process for making radial multi-block copolymer:

(a) anionically polymerizing styrene monomer $A_1$, at least one monovinylarene monomer $A_2$ other than styrene and at least one conjugated diene monomer $B_1$ using a lithium-based initiator to form block copolymer chains;

(b) adding a metal alkyl compound other than the lithium-based initiator after initiating anionic polymerization in step (a), wherein the molar ratio of the metal alkyl compound to lithium is greater than about 2.0; and (c) adding a coupling agent having more than two functional groups to form a radial multi-block copolymer, wherein the radial multi-block copolymer comprises a residue Z derived from the coupling agent and block copolymer chains from step (a) coupled to the residue Z. In one embodiment, the weight percent of the radial multi-block copolymer having at least five block copolymer chains attached to the residue Z is at least about 40. Preferably, the radial multi-block copolymer does not have a yellow tint, and the coupling efficiency is preferably at least about 70 percent.

In one embodiment, the radial multi-block copolymer has the structure $(B_1A_1A_2)_nZ$ and/or $(A_1A_2B_1)_nZ$, where n is the number of block copolymer chains coupled to the coupling agent residue Z, and where the molar ratio of the metal alkyl compound to lithium is preferably about 3.0. In another embodiment, the process further includes anionically polymerizing a conjugated diene monomer $B_2$ with the block copolymer chains from step (a) after the metal alkyl compound is added and before the coupling agent is added. Preferably, arms are formed having the structure $(B_1A_1A_2\ B_2)$, where the radial multi-block copolymer has the structure $(B_1A_1A_2\ B_2)nZ$, and where n is the number of arms coupled to the coupling agent residue Z.

The living multi-block copolymer $(B_1A_1A_2B_2)$ has a number average molecular weight from about 5,000 to about 500,000 g/mol. The $B_2$ block has a number average molecular weight from about 500 to about 5,000 g/mol. The living multi-block copolymer $(B_1A_1A_2B_2)$ comprises at least from about 10 wt % to about 90 wt % of monovinylarene monomer $(A_1+A_2)$ and at least from about 90 wt % to about 10 wt % of conjugated diene monomer $(B_1+B_2)$. The living multi-block copolymer $(B_1A_1A_2B_2)$ is composed of from about 8 wt % to about 60 wt % of vinyl units in the polydiene blocks $(B_1+B_2)$.

The coupling promoter is at least one metal alkyl compound, preferably an alkyl aluminum compound, and more preferably the metal alkyl compound is triethylaluminum. For the coupling promoter, the molar ratio of metal alkyl compound to living multi-block copolymer $(B_1A_1A_2B_2)$ ranges from about 1.6:1 to about 5:1, preferably from about 2:1 to about 4:1 and is more preferably about 3:1.

In another embodiment, the present invention provides the following process for producing a radial multi-block copolymer:

(a) anionically polymerizing styrene monomer $A_1$ and at least another type of monovinylarene monomer $A_2$ with a lithium-based initiator, wherein a block $A_1A_2$ is formed;

(b) anionically polymerizing at least one conjugated diene monomer to form a block B, wherein a polymer chain having the structure $A_1A_2B$ and/or $BA_1A_2$ is formed having a polydienyllithium carbanion at the end of the polymer chain;

(c) adding a metal alkyl compound other than the lithium-based initiator after the polymerization in step (b), wherein the molar ratio of the metal alkyl compound to lithium is greater than about 2.0; and (d) adding a coupling agent, wherein a radial multi-block copolymer having the structure $(A_1A_2B)_nZ$ and/or $(A_2A_1B)_nZ$ is formed, wherein Z is a residue of the coupling agent, and wherein the weight percent of n=5+ is greater than about 40. Preferably, the amount of monovinylarene monomer $A_2$ is from about 0.5 wt % to about 80 wt % of the total amount of $A_1A_2$.

The present invention uses metal alkyl compounds to avoid yellowness in both the radial multi-block copolymer cement and the porous pellet product and as a coupling promoter to improve coupling efficiency, while also maintaining control of the number of arms of living block copolymers condensated in the coupling agent. The coupling promoters of the present invention are selected from alkyl aluminum compounds. Coupling efficiency is the percentage of linear living block copolymers condensated to form radial block copolymer. The coupling agents of the present invention are selected from the group consisting of polyesters, polyacrylates, polymethacrylates, polyketones and similar compounds.

Radial multi-block copolymers having the structure $(B_1A_1A_2B_2)_nZ$ of the present invention can be used as: (1) a base for pressure-sensitive adhesives that have excellent mechanical and adhesives properties and low viscosity; (2) an asphalt modifier to prepare polymer-modified asphalt for road and roofing applications with enhanced mechanical and rheological properties and good control on viscosity; and (3) as a modification agent for improving mechanical properties of engineering plastics, as well as in other applications similar to these applications.

DETAILED DESCRIPTION OF THE INVENTION

The present invention concerns a novel anionic radial multi-block copolymer $(B_1A_1A_2B_2)_nZ$, wherein $A_1$ is a polystyrene block, $A_2$ is a block from monovinylarene monomer other than styrene monomer, and $B_1$ and $B_2$ are blocks from the same or different conjugated diene monomers, n is the number of arms, and Z is a residue of a coupling agent selected from polyesters, polyacrylates, polymethacrylates, and polyketones compounds, and the like. The main characteristic of the novel radial multi-block copolymer $(B_1A_1A_2B_2)_nZ$ is its well-defined molecular architecture, which offers a specific composition to control viscosity, without yellowness, for pressure-sensitive adhesive, asphalt formulations and engineering plastics applications.

The $A_1$ block in the radial multi-block copolymer $(B_1A_1A_2B_2)_nZ$ of the present invention is polystyrene, while the $A_2$ block comprises at least one monovinylarene monomer different than styrene monomer, including but not limited to, alpha-methyl styrene, o-methyl styrene, m-methyl styrene, p-methyl styrene, o-tertbutyl styrene, m-tertbutyl styrene, p-tertbutyl styrene, or mixtures thereof. Preferably, the $A_2$ block is made of p-methyl styrene or p-tertbutyl styrene, or mixtures thereof. The number average molecular weight of the $A_1A_2$ block to achieve good properties of the disclosed applications in this invention is from about 3,000 to about 100,000, preferably from about 4,000 to about 40,000, wherein the amount of $A_2$ block is from about 0.5 wt % to about 80 wt %, preferably from about 1 wt % to about 50 wt %, and more preferably from about 2 wt % to about 30 wt % of the total amount of monomers to form the $A_1A_2$ block.

In the present invention, the $B_1$ and $B_2$ blocks have the same or a different composition and comprise at least one conjugated diene monomer, including but not limited to, 1,3-butadiene, isoprene, 1,3-pentadiene, methylpentadiene, 2,3-dimethyl-1,3-butadiene, and the like and are preferably 1,3-butadiene and isoprene.

The number average molecular weight of the living block copolymer $(B_1A_1A_2B_2)$ to achieve good properties of the disclosed applications in this invention is from about 5,000 to about 600,000, preferably from about 15,000 to about 400,000, and more preferably from about 30,000 to about 100,000. The novel radial multi-block copolymer $(B_1A_1A_2B_2)_nZ$ has a ratio of $(A_1+A_2)/(B_1+B_2)$ of from about 10/90 wt/wt to about 50/50 wt/wt, more preferably from about 20/80 to 35/65, where $B$, is from about 0 wt % to about 99 wt % of the total amount of conjugated diene monomers to form $(B_1+B_2)$ blocks, and $B_2$ is from about 1 wt % to about 100 wt % of the total amount to form the $(B_1+B_2)$ blocks to achieve excellent performance on adhesives formulations, asphalt modification, and engineering plastics applications.

The anionic polymerization technique to produce block copolymers is a well known process in the state of the art as described in *Anionic Polymerization—Principles and Practical Applications*, by H. L. Hsieh, and R. P. Quirk, which was published by Marcel Dekker in 1996. Anionic polymerization is one of the more versatile techniques for the preparation of very well-defined block copolymers with narrow molecular weight distributions and with well-defined architectures and compositions. An interesting advantage of the anionic polymerization technique is the remaining living nature of the polymer chain ends after the added monomer is consumed. This advantage allows preparation of sequentially perfect block copolymers.

Industrial processes to prepare anionic block copolymers are initiated by using commercial initiators based on organolithium compounds, preferably alkyl lithium compounds such as methyl lithium, ethyl lithium, t-butyl lithium, n-butyl lithium, sec-butyl lithium, and more preferably sec-butyl lithium and n-butyl lithium. In a solution process for anionic polymerization, hydrocarbon solvents are typically used to prepare block copolymers. Examples of suitable solvents include, but are not limited to, pentane, hexane, heptane, octane, cyclopentane, cyclohexane, cycloheptane, toluene, xylene, and tetrahydrofurane, and preferably, cyclohexane is used.

The present invention provides a radial multi-block copolymer $(B_1A_1A_2B_2)_nZ$ with good control of vinyl content of the conjugated diene in the B blocks. In this invention, the term vinyl refers to a pendant vinyl group on the B blocks. Tertiary amine compounds and ether compounds are very useful to modify the microstructure of polydienes prepared by anionic polymerization. Some examples of tertiary amines are trimethyl amine, triethyl amine, tributyl amine, N,N-dimethyl aniline, N-ethyl piperidine, N-methyl pyrrolidine, N,N,N',N'-tetramethylethylene diamine, N,N,N',N'-tetraethylethylene diamine. Some examples of ether compounds are dimethyl ether, diethyl ether, diphenyl ether, and cyclic ethers. Preferably, in this invention is N,N,N',N'-tetramethylethylene diamine is used. In the present invention, the linear $(B_1A_1A_2B_2)$ copolymer includes about 8 wt % to about 60 wt % of vinyl units in the $(B_1+B_2)$ blocks to achieve excellent performance of the radial $(B_1A_1A_2B_2)_nZ$ copolymer for preparing pressure-sensitive adhesives formulations, polymer-modified asphalts, and engineering plastic composites.

The solution anionic polymerization technique can be made as disclosed in the prior art, such as in U.S. Pat. Nos. 3,149,182; 3,281,383; and 3,753,936. In this technique, a batch reactor is used to reach reaction conditions, such as temperature and mixing type during a given residence time. The anionic polymerization is carried out when monomers are in an appropriate solvent and an organolithium compound is added to initiate the polymerization reaction. Suitable solvents, monomers, and initiators were described above. The polymerization temperature is usually between 0° C. and 180° C., preferably ranging between about 30° C. and about 150° C., in a commercial process. The atmosphere of the polymerization system is preferably an inert gas atmosphere of nitrogen gas, and residence time is typically between about 0.1 and about 5 hours, preferably from about 0.2 to about 2 hours, depending on the reaction temperature, the initiator concentration, and the selected molecular architecture of the radial block copolymer.

A key characteristic of anionic polymerization is the "living" nature of the polymer chain end, and it is possible to add some termination agent or coupling agent to achieve a desired molecular architecture. The living block polymer can be terminated by addition of an electrophilic compound or a proton donor compound such as carbon dioxide, oxygen, water, alcohols, mercaptans, and primary and secondary amines as described in U.S. Pat. No. 2,975,160, which is incorporated by reference. Another technique to terminate a living block copolymer is by using coupling agents. Coupling agents are usually used to modify molecular architecture of copolymers because a living linear copolymer becomes an arm when it is condensated in a coupling agent. If there are two arms per coupling agent, the resulting material is a linear triblock copolymer, and if the final block copolymer has more than three arms (branches), it is called a radial block copolymer.

According to the present invention, a polydienyl-lithium is preferred at the end of the polymer chain before adding the coupling agent, because the living block copolymer before coupling addition has a B block at the end of the polymer chain to form a linear multi-block copolymer $(B_1A_1A_2B_2)$. In the case when monovinylarene monomer (A) and conjugated diene monomers (B) are both polymerized at the same time, a living tapered structure (BA) is yielded as described in U.S. Pat. No. 2,975,160. In this case, it is preferred to form a second B block $(B_2)$, adding a conjugated diene monomer, including but not limited to, 1,3-butadiene, isoprene, 1,3-pentadiene, methylpentadiene, 2,3-dimethyl-1,3-butadiene, and the like, and are preferably 1,3-butadiene or isoprene from about 1 wt % to about 20 wt % of the total amount of the added conjugated diene monomers to form the $(B_1+B_2)$ blocks, more preferably from about 1 wt % to about 5 wt %.

The structure $B_1A_1A_2B_2$ is obtained rather than the structure $A_1A_2 B_1B_2$. Hsieh H. L. and Quirk R. P., *Anionic Polymerization—Principles and Practical Applications*, Marcel Dekker 1996, say on page 406 "with an overall B/S-S structure," which means when styrene and 1,3-butadiene monomer are reacting at the same time, butadiene reacts faster than styrene, so the first block must be $B_1$. Also, the structure $A_1A_2B_1B_2$ can be only produced by sequential anionic polymerization. When $B_2$ is added to $B_1A_1A_2$, the structure $B_1A_1A_2B_2$ is obtained rather than the structure $A_1A_2B_1B_2$ because $B_1A_1A_2$ has only one reacting site in $A_2$, which is with a carbanion at the end of a polymer chain.

The present invention provides radial multi-block copolymers $(B_1A_1A_2B_2)_nZ$ with a high percentage of n=5+ arms and with good control of viscosity, wherein $A_1$ is a polystyrene block, $A_2$ is a block from monovinylarene monomer different to styrene monomer, and $B_1$ and $B_2$ are blocks from the same or different conjugated diene monomers. The coupling agents can be selected from polyepoxides, polyisocyanates, polyimines, polyaldehides, polyketones, polyanhydrides, polyesters, polyhalides, and the like as disclosed by Zellinski in U.S. Pat. No. 3,281,383. In the present invention, the use of polyesters, polyacrylates, polymethacrylates, and polyketone compounds, and the like is preferred. Examples of suitable coupling agents include, but are not limited to, poly(methyl acrylate), poly(ethyl acrylate), poly(n-propyl acrylate), poly(i-propyl acrylate), poly(n-butyl acrylate), poly(s-butyl acrylate), poly(i-butyl acrylate), poly(t-butyl acrylate), poly(n-amyl acrylate), poly(i-amyl acrylate), poly(isobornyl acrylate), poly(n-hexyl acrylate), poly(2-ethylbutyl acrylate), poly(2-ethyl-hexyl acrylate), poly(n-octyl acrylate), poly(isooctyl acrylate), poly(n-decyl acrylate), poly(methylcyclohexyl acrylate), poly(cyclopentyl acrylate), poly(cyclohexyl acrylate), poly(methyl methacrylate), poly(ethyl methacrylate), poly(n-propyl methacrylate), poly(n-butyl methacrylate), poly(i-propyl methacrylate), poly(i-butyl methacrylate), poly(n-amyl methacrylate), poly(n-hexyl methacrylate), poly(i-amyl methacrylate), poly(s-butyl methacrylate), poly(t-butyl methacrylate), poly(2-ethyl-butyl methacrylate), poly(2-ethyl-hexyl methacrylate), poly(n-octyl methacrylate), poly(isooctyl methacrylate), poly(methyl-cyclohexyl methacrylate), poly(cinnamyl methacrylate), poly(crotyl methacrylate), poly(cyclohexyl methacrylate), poly(cyclopentyl methacrylate), poly(2-ethoxy-ethyl methacrylate), poly(isobornyl methacrylate), and copolymers prepared with them, or mixtures thereof. Also, for purposes of the present invention, the amount of coupling agent added to the living multi-block copolymer $(B_1A_1A_2B_2)$ varies from about 0.001 wt % to about 10 wt %, preferably from about 0.05 wt % to about 3 wt %; and more preferably from about 0.1 wt % to about 1 wt %.

Coupling efficiency is defined as the percentage of linear living block copolymers condensated to form radial block copolymer, and it is determined by gel permeation chromatography (GPC). In a GPC curve, the radial block copolymer (RBC) and the remaining linear block copolymer (RLBC) are clearly distinguished because of differences in elution time between them. The coupling efficiency is determined by finding the cumulative area percentage when a minimum in a normalized GPC curve between the RBC and RLBC peaks are observed. The average number of arms in the RBC is calculated by taking the molecular weight in the peak of the RBC (Mp RBC) and the molecular weight in the peak of the RLBC (Mp of RLBC) and using the following expression: Mp RBC/Mp RLBC. N-values were approximately obtained by sliding the GPC curve as a function of the given linear molecular weight. For example, the percentage of coupled copolymer when n=3 is taken when the polymer weight is 3-fold from the linear block copolymer in the GPC curve.

Coupling efficiency depends on the type and amount of coupling agent, reaction medium (type of solvent), reactive terminal carbanion, and temperature. If the preferred coupling agent is added at elevated temperatures, competition between terminating reactions and coupling reactions is observed, and therefore, the coupling efficiency is decreased. In prior art, the coupling efficiency is around 50-60% for polyisoprene and isoprene-styrene copolymers and around 45% for styirene-butadiene copolymers as described by DuBois et al. in U.S. Pat. No. 5,397,841 for alkylmethacrylates as coupling agents in a solution anionic polymerization process. U.S. Pat. No. 5,397,841, issued to DuBois et al., is incorporated by reference. To increase coupling efficiency, metal alkyl compounds can be used as coupling promoters in an anionic polymerization process. In the present invention, metal alkyl compounds, such as alkyl aluminum compounds, are used. Some examples of metal alkyl compounds are triethyl aluminum, trimethyl aluminum, tri-n-propyl aluminum, tri-n-butyl aluminum, triisobutyl aluminum, tri-n-hexyl aluminum, and trioctyl aluminum. Triethyl aluminum is preferred.

According to the present invention, a molar ratio of the alkyl aluminum compound to a living block copolymer $(B_1A_1A_2B_2)$ is greater than about 2:1, preferably ranging from about 2:1 to about 4:1 and is more preferably from about 2.5:1 to about 3.5:1. In a preferred embodiment, the molar ratio of the alkyl aluminum compound to a living block copolymer $(B_1A_1A_2B_2)$ is about 3:1. The present invention is different from prior art in the preferred range of molar ratio of alkyl aluminum compound to living block copolymer $(B_1A_1A_2B_2)$ because, surprisingly, it was observed that a polymer cement was obtained with no yellowness, and the coupling efficiency increased to a level greater than 80% in radial multi-block copolymers $(B_1A_1A_2B_2)_nZ$ with good control of viscosity when it is used in, for example, pressure-sensitive adhesive formulations.

The grafting step between the living carbanion and the carbonyl group presented in polyesters, polyacrylates, polymethacrylates and polyketones compounds when they are used as coupling agents yield conjugated bonds in the residue of the coupling agent chain. Some conjugated bonds known as methines are responsible for producing color, which in this case is yellowness. Yellowness is a function of type of coupling agent and in the molar ratio of coupling agent to activated lithium. Yellowness is an undesirable characteristic in many applications, such as in pressure-sensitive adhesives and in engineering plastics. In polymer cement, a color in the cement, as opposed to clear and transparent cement, can be due to a living carbanion (i.e. polybutadienyllithium is slightly yellow and polystyrenyllithium is red). Also, in anionic polymerization when polyesters are used as coupling agents, yellowness is produced due to the formation of chromophores yielded from delocalization of conjugated diene groups. In this case, yellowness is maintained even when the polymer is "dead." Bening et al. in U.S. Pat. No. 7,009,000 described using alkyl compounds, but at a molar ratio of about 1:1 or so because of the deactivation of living carbanion. Bening et al. discovered that a metal alkyl compound increases coupling efficiency with only a diester compound, but they preferred radial block copolymers with less than 5 arms. In the present invention, it was discovered that by using a molar ratio of greater than about 2:1 (alkyl metal:carbanion), while also using a derivated-styrene monomer other than styrene monomer, the end living carbanion can maintain its reactivity to increase the coupling efficiency and to control the numbers of arms coupled. Evidence of the living nature of conjugated diene carbanions is provided by reacting a coupling agent with those polymer carbanions.

Bening et al. in U.S. Pat. No. 7,009,000 found that an acceptable viscosity of radial block copolymer is maintained by controlling the number of arms between 2 and 4 and decreasing the number of arms higher than 5 by using a metal alkyl compound, but the resulting performance of PSA, PMA and engineering plastics is not good enough for certain applications. It was discovered in the present invention that up to about 30 wt % of derivated-styrene monomer can be used and that five or more arms can be obtained while maintaining viscosity within an acceptable working range for excellent performance in many applications. Viscosity depends on molecular weight, molecular architecture and monomer distribution. In the present invention, it was discovered that up to 30 wt % p-methylstyrene or p-tertbutylstyrene (or any monovinylarene other than styrene) in the structure $B_1A_1A_2B_2$ can produce composites showing similar (or possibly lower) viscosities than was achieved with prior art copolymers. (See Table 3 and 4 below.)

Bening et al. disclosed a process to obtain high coupling efficiency using a diester compound, dimethyl adipate, which has only two ester groups, while a polyester is used in the present invention, so even at the same molar ratio metal alkyl:lithium 1:1, the results of the present invention differ from those obtained by Bening et al. Consider the following reactions:

ing patent at column 3, line 50, promoter was added near the end of polymerization. In the present invention, a decrease in reactivity was observed when promoter was added near the end of polymerization. Consequently, the metal alkyl compound is preferably added shortly before reaching the peak reaction temperature. However, no large differences were detected in the final polymer product that were a function of when the metal alkyl compound was added.

According to the present invention, the coupling agent promoter can be added at a high enough temperature to balance the slower propagation rate due to the addition of an amount of alkyl aluminum compound. Therefore, in this invention, alkyl aluminum compound is added after the initiation step, but not after peak reaction temperature. The temperature range is from about 90° C. to about 140° C., preferably from about 95° C. to about 120° C.

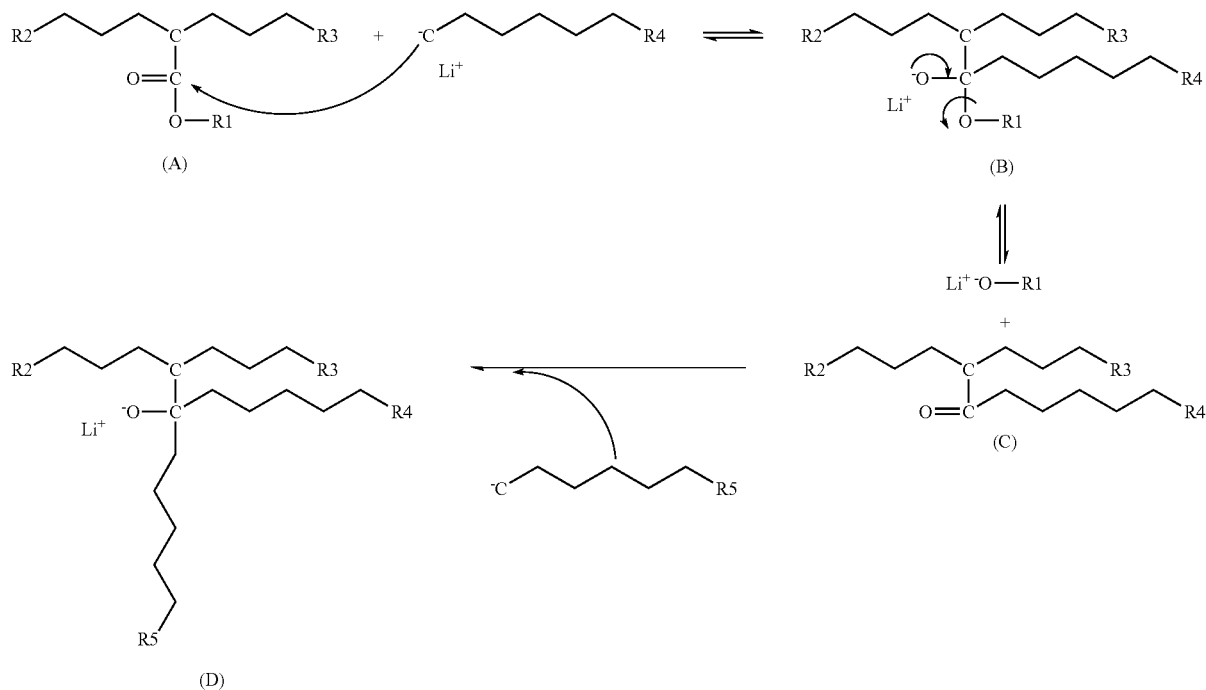

In step A, a carbanion reacts with an ester group. In step B a rearrangement is obtained, then a $LiOR_1$ molecule is released, and the molecule R4 is coupled in the coupling agent. In step C the polymer structure shows a carbonyl group available (ketone group), making it possible to couple another polymer chain. Finally, another carbanion presented in chain R5 can be coupled as seen in step D. In step D, —$CO^{(-)}Li^{(+)}$ structure has a higher chemical stability than carbanion structure —$C^{(-)}Li^{(+)}$, so a carbanion can not couple on it. It would be expected that Bening et al. would have obtained two arms with a diester compound, but they obtained a radial block copolymer having a portion with five or more arms. Bening et al. preferred less than about 8 weight percent n=5+. In contrast, the present invention generally has at least about 30 wt % of n=5+, in some embodiments at least about 40 wt % of n=5+, in some embodiments at least about 50 wt % of n=5+, in some embodiments at least about 60 wt % of n=5+, and in some embodiments at least about 70 wt % of n=5+.

Bening et al. expressed their molar ratio in terms of equivalents while the term molar ratio is used here, but either term can be used without a conversion being required. In the Ben- In summary, in the present invention, styrene monomer is reacted simultaneously with a non-styrene monovinylarene monomer and a conjugated diene monomer. At about 2° C. or so before a peak reaction temperature is reached, an alkyl aluminum compound is added at a molar ratio of the alkyl aluminum compound to a living block copolymer $(B_1A_1A_2B_2)$ of from at least about 1.6:1, preferably at least about 2:1, along with additional or a second conjugated diene monomer. One of the coupling agents described above, which provides high coupling efficiency, is added to form a radial multi-block copolymer having at least three arms, preferably having a substantial amount that is at least about five arms. The present invention preferably has at least about 35 wt % of n=5+, preferably at least about 40 wt % of n=5+ and more preferably at least about 55 wt % of n=5+.

In one embodiment, the present invention provides a process for producing a radial multi-block copolymer $(A_1A_2B_2)_nZ$ without a soft B, block by anionically polymerizing styrene monomer $A_1$ and at least another type of monovinylarene monomer $A_2$, where the amount of the other type of monovinylarene monomer is from about 0.5 wt % to about 80 wt % of the total amount to form a hard $A_1A_2$ block, anionically polymerizing at least one conjugated diene monomer to form a soft $B_2$ block and a polydienyllithium carbanion at the end of the polymer chain, adding the coupling promoter after initiating anionic polymerization but not after the peak reaction temperature, where the coupling promoter is at least one metal alkyl compound, and finally, admixing a coupling agent selected from polyesters, polyacrylates, polymethacrylates, and polyketones compounds, and the like, and retaining a residue (Z) of such coupling agent in the copolymer chain.

The monovinylarene monomer $A_2$ is at least one monovinylaromatic monomer, preferably p-methylstyrene and p-tertbutylstyrene. The conjugated diene monomer $B_2$ is 1,3-butadiene and/or isoprene, preferably 1,3-butadiene. The initiator is any organolithium compound selected from alkyllithium compounds, preferably n-butyllithium and sec-butyllithium, and more preferably, n-butyllithium. The living multi-block copolymer $(B_1A_1A_2B_2)$ has a number average molecular weight of from about 5,000 to about 400,000 g/mol. The living multi-block copolymer $(B_1A_1A_2B_2)$ constitutes at least from about 10 to about 90 wt % of monovinylarene monomers, and at least from about 90 wt % to about 10 wt % of conjugated diene monomers. The living multi-block copolymer $(B_1A_1A_2B_2)$ is composed of from about 8 wt % to about 60 wt % of vinyl units in the polydiene block. The coupling promoter comprises at least one metal alkyl compound, preferably an alkyl aluminum compound. Triethylaluminum is suitable. The molar ratio of metal alkyl compound to living multi-block copolymer $(B_1A_1A_2B_2)$ ranges from about 1.6:1 to about 5:1, preferably from about 2:1 to about 4:1 and is more preferably about 3:1.

In another embodiment, the present invention provides a process for producing radial multi-block copolymers $(A_1A_2B_2)_nZ$, which comprises anionically polymerizing styrene monomer $A_1$ to form a first hard $A_1$ block, anionically polymerizing at least another type of monovinylarene monomer to form a second hard block $A_2$, wherein the amount of the other type of monovinylarene monomer is from about 0.5 wt % to about 80 wt % of the total amount to form the whole hard block $A_1A_2$ of the radial block copolymer, anionically polymerizing at least one conjugated diene monomer to form a soft $B_2$ block and a polydienyllithium carbanion at the end of the polymer chain, adding the coupling promoter after initiating anionic polymerization but not after (and preferably before) the peak reaction temperature, wherein the coupling promoter is one metal alkyl compound, and finally, mixing in a coupling agent containing Z, wherein a residue Z of the coupling agent bonds the polymer chains together to form a radial multi-block copolymer having the structure $(A_1A_2B_2)_nZ$, which does not have a soft block $B_1$ in the copolymer chain.

The various radial multi-block copolymers described above can be used to make an adhesive composition comprising the radial multi-block copolymer and another type of block copolymer, tackifying resins, extender oil, and a stabilizer system. The various radial multi-block copolymers described above can be hydrogenated using a hydrogenation process. The various radial multi-block copolymers described above can be used to make a modified engineering plastic comprising a radial multi-block copolymer described above, preferably hydrogenated, and at least one engineering plastic.

Surprisingly, by using a different molar ratio of metal alkyl compound lithium than taught or suggested in the prior art, we obtained a higher coupling efficiency, a different and better final molecular structure, a higher average number of arms in the radial multi-block copolymer, better control on polydispersity index, a higher percentage of coupled multi-block copolymer having n=5+ arms, and an essentially clear, transparent polymer cement and dried porous pellet product that is not yellow and does not have a yellow tint. Radial multi-block copolymers of the present invention can be used in adhesives, modified asphalt and engineering plastics.

The present invention provides pressure-sensitive adhesive compositions and hot-melt adhesive compositions having excellent properties comprising the inventive radial multi-block copolymer $(B_1A_1A_2B_2)_nZ$ along with tackifying resin, extender oil, and a stabilizer system. The preferred amount of radial multi-block copolymer $(B_1A_1A_2B_2)_nZ$ in the present invention for an adhesive composition is from about 10 wt % to 40 wt %, preferably 15 wt % to 30 wt %, and more preferably 18 wt % to 25 wt %. The adhesive composition preferably includes naphthenic or paraffinic plasticizers or mixtures thereof ranging from about 18 wt % to about 25 wt %, a tackifier compound such as terpene/styrenic or rosins esters or hydrocarbon resins ranging from about 45 wt % to about 60 wt % and a stabilizer system such as phenolic hindered antioxidants and phosphate-derived antioxidants ranging from about 0.5 wt % to about 2 wt %.

The present invention provides a polymer-modified asphalt comprising from about 2 to about 20 wt % of the radial multi-block copolymer $(B_1A_1A_2B_2)_nZ$ and a suitable asphalt for road or roofing application and a PMA with 2 wt % to about 20 wt % of a radial multi-block copolymer having the structure $(A_1A_2B_2)_nZ$. The radial multi-block copolymer may include a copolymer of $A_1$ and $A_2$ or one block of $A_1$ and a block of $A_2$. Styrene-butadiene block copolymers may be used for asphalt modification as described in U.S. Pat. No. 5,229,464. The disclosed radial multi-block copolymer $(B_1A_1A_2B_2)_nZ$ of the instant invention has shown excellent properties as an asphalt modifier in an amount in the range of from about 2 wt % to about 20 wt %, preferably of from about 3 wt % to about 14 wt % based on the total asphalt composition. The asphalt composition may also contain other compounds, such as a crosslinking agent to decrease phase segregation between polymer and asphalt.

The disclosed radial multi-block copolymer of the instant invention shows excellent performance in hydrogenated and unhydrogenated structures, but in some applications, hydrogenated polymers are preferred due to their higher thermal stability to minimize oxidation processes. Hydrogenation of the disclosed radial multi-block copolymer $(B_1A_1A_2B_2)_nZ$ of the present invention can be made by any technique disclosed in prior art, such as described in U.S. Pat. Nos. 3,113,986, 4,226,952, 4,801,857, and 5,583,185, and occurs selectively in the unsaturated bonds of polydiene blocks $B_1$ and $B_2$.

The disclosed unhydrogenated and hydrogenated radial multi-block copolymers can be used as part of an asphalt composition, an adhesive composition, and a plastic composite. The plastic composite can be used for some automotive applications by mixing it with at least one engineering plastic, including but not limited to, poly(butylene terephthalate) (PBT), polyethylene terephthalate (PET), polycarbonate (PC), polyethylene (PE), polypropylene (PP), polystyrene (PS) and mixtures thereof.

In this invention, it is preferred to use a single-step process in a commercial adiabatic batch tank reactor (ABTR) adapted to carry out anionic polymerization in an inert atmosphere. As an example, a $(B_1A_1A_2B_2)_nZ$ molecular structure can be obtained by using poly(2-ethyl-hexyl-acrylate). One may add all monomers at the ABTR, for example, 22 wt % of styrene monomer, 8 wt % of p-tertbutylstyrene monomer, and 56-69 wt % of conjugated diene monomer in a first addition. Initial temperature is reached by heating the reactor system to around 40-50° C., then, an amount of initiator (i.e. n-butyl lithium) is added in order to obtain the desired molecular weight. An exothermal peak is observed with reaction times of about 5-10 minutes, which is a function of the desired molecular weight. Before reaching the temperature peak (115-130° C.), an amount of metal alkyl compound in a preferred molar ratio of TEA:Li of 3:1 is added in a single discrete addition (within about 20-30 seconds). Preferably, the metal alkyl compound is added at temperatures above 105° C. A second addition of from about 1 to about 14 wt % conjugated diene monomer is made after 1 minute of metal alkyl addition. Residence time is about 10-15 minutes. Next, the coupling agent (poly(2-ethyl-hexyl-acrylate)) is added in 30-60 seconds in a single discrete addition. Residence time is around 7-10 minutes, and the temperature is preferably about 100-115° C. In the same ABTR, an amount of an alcohol is added to terminate the unreacted ($B_1A_1A_2B_2$) block copolymer in a single discrete addition at around 95-105° C. Finally, an essentially clear, transparent polymer cement of radial block copolymer is obtained, which does not have a yellow tint. The polymer cement in the ABTR is poured into another stirred tank called a blend tank, and 2 wt % of antioxidants is added to the polymer cement in a single discrete addition at 90-95° C., and a residence time of 10 minutes is allowed. A steam stripping stage can be used to separate polymer from cyclohexane, changing the dispersion medium (water) at 80-85° C. Then, crumb polymer is dispersed in water. Next stage, the wet crumb polymer is passed through an expeller-expander system to get dried porous pellet polymer. The grafting step between the carbanion and the carbonyl group presented in the coupling agent yields conjugated bonds in the residue of the coupling agent chain. It is recognized that some conjugated bonds known as methines are responsible for producing color, which in this case is yellowness. In this stage yellowness may decrease because water deactivates the methine moieties in the chains of the radial multi-block copolymer. However, in the case where a vacuum stripping hot-mix method is used to get dried product, water is not used, so yellowness remains in the dried crumb radial multi-block copolymer as in the polymer cement. The present invention avoids this yellowness and instead yields from a clear, colorless polymer cement a white crumb and a white pellet that does not have a yellow tint.

EXAMPLES

The invention will be further described by reference to the following examples, which are presented for the purpose of illustration only and are not intended to limit the scope of the invention.

Example 1

An adiabatic batch tank reactor with 2 liters of capacity, having a propeller agitator working at 145 rpm, was adapted to carry out anionic polymerization in an inert atmosphere (nitrogen gas) using 560 grams of a preferred solvent (cyclohexane), 22 grams of styrene monomer, 8 grams of p-methylstyrene monomer, and 7.5 mg of N,N,N',N'-tetramethylethylene diamine (TMEDA). After heating to a reaction temperature of 75° C., 0.1478 grams of n-butyl lithium was added into the reactor under continued stirring at 145 rpm. A residence time of around ten minutes was allowed to ensure the consumption of both monomers to form $A_1A_2$ blocks. After that, 70 grams of 1,3-butadiene monomer were slowly added into the system to make a soft $B_2$ block. At 90% of the total quantity of 1,3-butadiene monomer, 1.1868 grams of triethylaluminum (TEA) at a molar ratio TEA:Lithium of 4.5:1 were added at around 102° C. while the remaining amount of the 1,3-butadiene monomer was allowed to feed continuously into the reactor. After six minutes, a living linear multi-block copolymer $A_1A_2B_2$ was obtained. Then, 0.8 grams of poly(2-ethyl-hexyl-acrylate) were added into the system at 94° C. A residence time of five minutes was allowed. Finally, the remaining living polymer chains were terminated by using isopropanol. Main characteristics of Example 1 are given in Table 1.

Example 2

An adiabatic batch tank reactor with 2 liters of capacity, having a propeller agitator working at 145 rpm, was adapted to carry out anionic polymerization in an inert atmosphere (nitrogen gas) using 470 grams of a preferred solvent (cyclohexane), 22 grams of styrene monomer, 8 grams of p-methylstyrene monomer, and 7.6 mg of TMEDA. After heating to a reaction temperature of 75° C., 0.1281 grams of n-butyl lithium was added into the reactor under continued stirring at 145 rpm. A residence time of around ten minutes was allowed to ensure the consumption of both monomers to form $A_1A_2$ blocks. After that, 70 grams of 1,3-butadiene monomer were slowly added into the system to make a soft $B_2$ block, however, at 90% of the total quantity of 1,3-butadiene monomer, 1.028 grams of triethylaluminum (TEA) at a molar ratio TEA:Lithium of 4.5:1 were added at around 103° C. while the remaining amount of the conjugated vinyl monomer was allowed to feed continuously into the reactor. After six minutes, a living linear multi-block copolymer $A_1A_2B_2$ was obtained. Then, 0.7 grams of poly(2-ethyl-hexyl-acrylate) were added into the system at 93° C. A residence time of five minutes was allowed. Finally, the remaining living polymer chains were terminated by using isopropanol. Main characteristics of Example 2 are given in Table 1.

Example 3

The same procedure was followed as in Example 1, except 1.0549 grams of TEA were used at a molar ratio TEA:Lithium of 4.0:1 and were added at around 99° C. Main characteristics of Example 3 are given in Table 1.

Example 4

The same procedure was followed as in Example 1, except 0.9231 grams of TEA were used at a molar ratio TEA:Lithium of 3.5:1 and were added at around 101° C. Main characteristics of Example 4 are given in Table 1.

Example 5

The same procedure was followed as in Example 1, except 0.7912 grams of TEA were used at a molar ratio TEA:Lithium of 3.0:1 and were added at around 106° C. Main characteristics of Example 5 are given in Table 1.

Example 6

The same procedure was followed as in Example 1, except 0.6593 grams of TEA were used at a molar ratio TEA:Lithium of 2.5:1 and were added at around 103° C. Main characteristics of Example 6 are given in Table 1.

Example 7

The same procedure was followed as in Example 1, except 0.5274 grams of TEA were used at a molar ratio TEA:Lithium of 2:1 and were added at around 101° C. Main characteristics of Example 7 are given in Table 1.

Example 8

The same procedure was followed as in Example 2, except 0.4570 grams of TEA were used at a molar ratio TEA:Lithium of 2:1 and were added at around 102° C. Table 1 provides the main characteristics of Example 8.

Example 9

The same procedure was followed as in Example 1, except 0.2637 grams of TEA were used at a molar ratio TEA:Lithium of 1:1 and were added at around 104° C. Main characteristics of Example 9 are given in Table 1.

Example 10

The same procedure was followed as in Example 2, except 0.2280 grams of TEA were used to have a molar ratio of TEA:Lithium of 1:1. Main characteristics of Example 10 are given in Table 1.

Example 11

The same procedure was followed as in Example 1, except TEA was not added. Main characteristics of Example 11 are given in Table 1.

Example 12

The same procedure was followed as in Example 1, except employing 30 grams of styrene monomer, and p-methylstyrene monomer was not added. TEA was added at around 104° C. Main characteristics of Example 12 are given in Table 1.

Example 13

The same procedure was followed as in Example 2, except employing 30 grams of styrene monomer, and p-methylstyrene monomer was not added. TEA was added at around 110° C. Main characteristics of Example 13 are given in Table 1.

Example 14

The same procedure was followed as in Example 12, except 0.7912 grams of TEA were used at a molar ratio TEA:Lithium of 3:1 and were added at around 110° C. Main characteristics of Example 14 are given in Table 1.

Example 15

The same procedure was followed as in Example 2, except employing 30 grams of styrene monomer, and p-methylstyrene monomer was not added. Also, 0.6850 grams of TEA were charged at a molar ratio of TEA:Lithium of 3:1 and were added at around 110° C. Table 1 provides the main characteristics of Example 15.

Example 16

The same procedure was followed as in Example 12, except 0.5274 grams of TEA were used at a molar ratio TEA:Lithium of 2:1 and were added at around 103° C. Main characteristics of Example 16 are given in Table 1.

Example 17

The same procedure was followed as in Example 12, except 0.2637 grams of TEA were used at a molar ratio TEA:Lithium of 1.0:1 and were added at around 103° C. Main characteristics of Example 17 are given in Table 1.

Example 18

The same procedure was followed as in Example 12, except TEA was not added. Main characteristics of Example 18 are given in Table 1.

Example 19

The same procedure was followed as in Example 2, except using 30 grams of styrene monomer, and p-methylstyrene monomer was not added. Also, TEA was not added. Table 1 provides the main characteristics of Example 19.

Example 20

The same procedure was followed as in Example 1, except employing 15 grams of styrene monomer and 15 grams of p-methylstyrene monomer, and 0.7912 grams of TEA were used at a molar ratio TEA:Lithium of 3:1 and were added at around 102° C. Main characteristics of Example 20 are given in Table 1.

Example 21

The same procedure was followed as in Example 1, except employing 29.2 grams of styrene monomer, 10.8 grams of p-methylstyrene monomer and 60 grams of 1,3-butadiene monomer in the same monomer sequence addition as described in Example 1. At around 90° C., 0.7912 grams of TEA were used at a molar ratio TEA:Lithium of 3:1. Main characteristics of Example 21 are given in Table 1.

Example 22

The same procedure was followed as in Example 1, except employing 14.6 grams of styrene monomer, 5.4 grams of p-methylstyrene monomer and 80 grams of 1,3-butadiene monomer in the same monomer sequence addition as described in Example 1. At around 104° C., 0.7912 grams of TEA were used at a molar ratio TEA:Lithium of 3:1. Main characteristics of Example 22 are given in Table 1.

Example 23

Reference 1

An adiabatic batch tank reactor with 2 liters of capacity, having a propeller agitator working at 145 rpm, was adapted to carry out anionic polymerization in an inert atmosphere (nitrogen gas) using 560 grams of a preferred solvent (cyclohexane), 30 grams of styrene monomer, and 7.5 mg of TMEDA. After heating to a reaction temperature of 75° C., 0.1478 grams of n-butyl lithium was added into the reactor under continued stirring at 145 rpm. A residence time of around ten minutes was allowed to ensure the consumption of styrene monomer to form the A block. After that, 70 grams of 1,3-butadiene monomer were slowly added into the system to make a soft B block, and at 90% of the total quantity of 1,3-butadiene monomer and at around 99° C., 1.0549 grams of TEA were added at a molar ratio TEA:Lithium of 1:1, while the remaining amount of the 1,3-butadiene monomer was allowed to feed continuously into the reactor. After six minutes, a living linear diblock copolymer AB was obtained. Then, 0.05 grams of dimethyl adipate were added into the system at 89° C. A residence time of five minutes was allowed. Finally, the remaining living polymer chains were terminated by using isopropanol. Main characteristics of Example 23 are given in Table 1.

TABLE 1

Synthesis of radial multi-block copolymers by sequential polymerization

| Rubber No. | Styrene monomer [%] | p-methyl styrene monomer [%] | 1,3-butadiene monomer [%] | Molar ratio TEA:Li | Molecular architecture | Linear Mp [g/mol] | Mn [g/mol] | Coupled Mp [g/mol] | PDI | Ave. Arms | Coup. Effic. [%] |
|---|---|---|---|---|---|---|---|---|---|---|---|
| 1 | 22.0 | 8.0 | 70 | 4.5:1 | $(A_1A_2B)_nZ$ | 61500 | 149100 | 357700 | 2.65 | 5.8 | 88.3 |
| 2 | 22.0 | 8.0 | 70 | 4.5:1 | $(A_1A_2B)_nZ$ | 39100 | 88400 | 301700 | 2.60 | 7.7 | 80.0 |
| 3 | 22.0 | 8.0 | 70 | 4.0:1 | $(A_1A_2B)_nZ$ | 66500 | 169200 | 383500 | 2.53 | 5.8 | 90.5 |
| 4 | 22.0 | 8.0 | 70 | 3.5:1 | $(A_1A_2B)_nZ$ | 76000 | 316100 | 544500 | 1.55 | 7.2 | 90.0 |
| 5 | 22.0 | 8.0 | 70 | 3.0:1 | $(A_1A_2B)_nZ$ | 74600 | 172600 | 456300 | 3.08 | 6.1 | 89.4 |
| 6 | 22.0 | 8.0 | 70 | 2.5:1 | $(A_1A_2B)_nZ$ | 69000 | 160200 | 502700 | 2.89 | 7.3 | 88.3 |
| 7 | 22.0 | 8.0 | 70 | 2.0:1 | $(A_1A_2B)_nZ$ | 66900 | 177900 | 359000 | 2.38 | 5.4 | 88.5 |
| 8 | 22.0 | 8.0 | 70 | 2.0:1 | $(A_1A_2B)_nZ$ | 63400 | 136300 | 324200 | 2.15 | 5.1 | 88.0 |
| 9 | 22.0 | 8.0 | 70 | 1.0:1 | $(A_1A_2B)_nZ$ | 69000 | 136200 | 362700 | 2.97 | 5.3 | 81.7 |
| 10 | 22.0 | 8.0 | 70 | 1.0:1 | $(A_1A_2B)_nZ$ | 79200 | 107000 | 570000 | 3.94 | 7.2 | 78.5 |
| 11 | 22.0 | 8.0 | 70 | 0.0:1 | $(A_1A_2B)_nZ$ | 75200 | 114800 | 737600 | 3.67 | 9.8 | 58.2 |
| 12 | 30.0 | 0.0 | 70 | 4.5:1 | $(A_1B)_nZ$ | 63500 | 147600 | 562100 | 2.88 | 8.9 | 85.3 |
| 13 | 30.0 | 0.0 | 70 | 4.5:1 | $(A_1B)_nZ$ | 47900 | 131100 | 343000 | 2.24 | 7.2 | 84.0 |
| 14 | 30.0 | 0.0 | 70 | 3.0:1 | $(A_1B)_nZ$ | 70300 | 170700 | 511100 | 2.55 | 7.3 | 88.0 |
| 15 | 30.0 | 0.0 | 70 | 3.0:1 | $(A_1B)_nZ$ | 52700 | 117400 | 311900 | 2.48 | 5.9 | 88.0 |
| 16 | 30.0 | 0.0 | 70 | 2.0:1 | $(A_1B)_nZ$ | 65000 | 133500 | 500500 | 2.94 | 7.7 | 84.3 |
| 17 | 30.0 | 0.0 | 70 | 1.0:1 | $(A_1B)_nZ$ | 66500 | 159100 | 357700 | 2.39 | 5.4 | 82.9 |
| 18 | 30.0 | 0.0 | 70 | 0.0:1 | $(A_1B)_nZ$ | 69200 | 109900 | 730200 | 3.70 | 10.6 | 57.9 |
| 19 | 30.0 | 0.0 | 70 | 0.0:1 | $(A_1B)_nZ$ | 63000 | 86000 | 450900 | 3.15 | 7.2 | 55.0 |
| 20 | 15.0 | 15.0 | 70 | 3.0:1 | $(A_1A_2B)_nZ$ | 69700 | 152400 | 619300 | 3.18 | 8.9 | 86.0 |
| 21 | 29.2 | 10.8 | 60 | 3.0:1 | $(A_1A_2B)_nZ$ | 66500 | 123900 | 347300 | 3.17 | 5.2 | 85.4 |
| 22 | 14.6 | 5.4 | 80 | 3.0:1 | $(A_1A_2B)_nZ$ | 64500 | 274100 | 375900 | 1.58 | 5.8 | 86.5 |
| 23-ref1 | 30.0 | 0.0 | 70 | 1.0:1 | $(AB)_nZ$ | 67700 | 79800 | 210100 | 1.54 | 3.1 | 40.5 |

| Rubber No. | n = 1 [%] | n = 2 [%] | n = 3 [%] | n = 4 [%] | n = 5+ [%] | MFI [g/10 min] | Solution viscosity [cPs] | Tint in Polymer Cement |
|---|---|---|---|---|---|---|---|---|
| 1 | 11.7 | 0.7 | 3.2 | 8.6 | 75.8 | 0.1640 | 208 | N |
| 2 | 20.0 | 3.2 | 2.7 | 5.7 | 68.4 | 10.9000 | 200 | N |
| 3 | 9.5 | 0.8 | 3.8 | 9.5 | 76.4 | 0.1620 | 256 | N |
| 4 | 10.0 | 1.0 | 4.5 | 10.2 | 74.3 | 0.0300 | 480 | N |
| 5 | 10.6 | 1.2 | 5.3 | 10.0 | 72.9 | 0.0300 | 420 | N |
| 6 | 11.7 | 0.9 | 4.1 | 9.0 | 74.3 | 0.0830 | 260 | N |
| 7 | 11.5 | 1.1 | 5.2 | 11.2 | 71.0 | 0.1655 | 216 | N |
| 8 | 12.0 | 3.8 | 11.5 | 16.0 | 56.7 | 0.1000 | 230 | N |
| 9 | 18.3 | 1.4 | 4.8 | 9.4 | 66.1 | 0.4485 | 260 | Y |
| 10 | 21.5 | 3.5 | 9.3 | 11.0 | 54.7 | 0.6530 | 250 | Y |
| 11 | 41.8 | 0.6 | 1.7 | 2.4 | 53.5 | 0.7320 | 272 | Y |
| 12 | 14.7 | 1.0 | 2.4 | 5.7 | 76.2 | 0.3435 | 280 | N |
| 13 | 16.0 | 0.9 | 3.1 | 6.3 | 73.7 | 0.6000 | 250 | N |
| 14 | 12.0 | 0.9 | 4.1 | 9.3 | 73.7 | 0.0450 | 440 | N |
| 15 | 12.0 | 0.8 | 6.0 | 12.8 | 68.4 | 0.2000 | 200 | N |
| 16 | 15.7 | 0.8 | 3.8 | 8.7 | 71.0 | 0.3160 | 256 | N |
| 17 | 17.1 | 1.1 | 4.6 | 9.7 | 67.5 | 0.1985 | 248 | Y |
| 18 | 42.1 | 0.5 | 1.5 | 2.2 | 53.7 | 1.3310 | 200 | Y |
| 19 | 45.0 | 1.6 | 3.1 | 4.1 | 46.2 | 0.4000 | 190 | Y |
| 20 | 14.0 | 0.8 | 2.4 | 5.8 | 77.0 | 0.0980 | 320 | N |
| 21 | 14.6 | 0.8 | 4.0 | 10.5 | 70.1 | 0.1055 | 160 | N |
| 22 | 13.5 | 0.8 | 2.8 | 7.3 | 75.6 | 2.4445 | 208 | N |
| 23-ref1 | 59.5 | 2.3 | 16.7 | 17.7 | 3.8 | 10.3385 | 120 | Y |

Example 24

An adiabatic batch tank reactor with 2 liters of capacity, having a propeller agitator working at 145 rpm, was adapted to carry out anionic polymerization in an inert atmosphere (nitrogen gas). The reactor was loaded with 560 grams of a preferred solvent (cyclohexane), 22.0 grams of styrene monomer, 8.0 grams of p-tertbutylstyrene monomer and 68.8 grams of 1,3-butadiene monomer. The mixture was continuously stirred at 145 rpm and heated. After reaching initial reaction temperature (75° C.), 0.0932 grams of n-butyl lithium was added into the reactor. Before the temperature peaked, 0.7450 grams of TEA were used to get a molar TEA:Lithium ratio of 4.5:1 and were added at around 106° C. as a single discrete addition. (A cross-propagation reaction promotes the $B_1$ formation prior to formation of $A_1$ or $A_2$, so a copolymer having the structure $B_1A_1A_2$ is formed.) Then, 1.2 grams of 1,3-butadiene monomer were added to form the second polydiene block ($B_2$), and a residence time of ten minutes was allowed to guarantee the consumption of monomers. Afterward, 0.51 grams of poly(2-ethyl-hexyl-acrylate) was admixed into the system at 88° C., and a residence time of five minutes was allowed. Finally, the remaining living polymer chains were terminated by using isopropanol. Properties and characteristics of the polymer formed under the conditions of Example 24 are set out in Table 2.

Example 25

An adiabatic batch tank reactor with 2 liters of capacity, having a propeller agitator working at 145 rpm, was adapted to carry out anionic polymerization in an inert atmosphere (nitrogen gas). The reactor was loaded with 459 grams of a preferred solvent (cyclohexane), 15.3 grams of styrene monomer, 7.2 grams of p-tertbutylstyrene monomer and 66.6 grams of 1,3-butadiene monomer. The mixture was continuously stirred at 145 rpm and heated. After reaching initial reaction temperature (75° C.), 0.0865 grams of n-butyl lithium were added into the reactor. Before the temperature peaked, 0.462 grams of TEA were added to get a molar TEA:Lithium ratio of 3:1 and were added at around 108° C. as a single discrete addition. Then, 0.9 grams of 1,3-butadiene monomer were added to form the second polydiene block ($B_2$), and a residence time of ten minutes was allowed to guarantee the consumption of monomers. Afterward, 0.62 grams of poly(2-ethyl-hexyl-acrylate) was admixed into the system at 97° C., and a residence time of five minutes was allowed. Finally, the remaining living polymer chains were terminated by using isopropanol. Properties and characteristics of the polymer formed under the conditions of Example 25 are set out in Table 2.

Example 26

The same procedure was followed as in Example 24, except 0.3311 grams of TEA were used at a molar ratio TEA:Lithium of 2:1 and were added at around 115° C. Main characteristics of Example 26 are summarized in Table 2.

Example 27

The same procedure was followed as in Example 24, except 0.1655 grams of TEA were used at a molar ratio TEA:Lithium of 1.0:1 and were added at around 115° C. Main characteristics of Example 27 are summarized in Table 2.

Example 28

The same procedure was followed as in Example 24, except TEA was not used. Main characteristics of Example 28 are summarized in Table 2.

Example 29

The same procedure was followed as in Example 25, except TEA was not used. Table 2 summarized the main characteristics of Example 29.

Example 30

The same procedure was followed as in Example 24, except employing 30 grams of styrene monomer, and p-tertbutylstyrene monomer was not added. TEA was added at around 110° C. Main characteristics of Example 30 are summarized in Table 2.

Example 31

The same procedure was followed as in Example 30, except 0.4966 grams of TEA were used at a molar ratio TEA:Lithium of 3:1 and were added at around 104° C. Main characteristics of Example 31 are summarized in Table 2.

Example 32

The same procedure was followed as in Example 25, except 22.5 grams of styrene monomer was used, and p-tertbutylstyrene monomer was not added. The main characteristics of the polymer of Example 32 are summarized in Table 2.

Example 33

The same procedure was followed as in Example 30, except 0.3311 grams of TEA were used at a molar ratio TEA:Lithium of 2:1 and were added at around 120° C. Main characteristics of Example 33 are summarized in Table 2.

Example 34

The same procedure was followed as in Example 30, except TEA was not added. Main characteristics of Example 34 are summarized in Table 2.

Example 35

The same procedure was followed as in Example 24, except employing 15 grams of styrene monomer, and 15 grams of p-tertbutylstyrene monomer. 0.4966 grams of TEA were used at a molar ratio TEA:Lithium of 3:1 and were added at around 105° C. Main characteristics of Example 35 are summarized in Table 2.

Example 36

Reference 2

An adiabatic batch tank reactor with 2 liters of capacity, having a propeller agitator working at 145 rpm, was adapted to carry out anionic polymerization in an inert atmosphere (nitrogen gas). The reactor was loaded with 560 grams of a preferred solvent (cyclohexane), 30 grams of styrene monomer and 70 grams of 1,3-butadiene monomer. The mixture was continuously stirred at 145 rpm and heated. After reaching initial reaction temperature (75° C.), 0.0932 grams of n-butyl lithium were added into the reactor. Before the temperature peaked, 0.1655 grams of TEA were added at around 106° C. as a single discrete addition to get a molar TEA:Lithium ratio of 1:1. (A cross-propagation reaction promotes the B formation prior to formation of A, so a copolymer having the structure BA is formed.) Afterward, 0.03 grams of dimethyl adipate were admixed into the system at 93° C., and a residence time of five minutes was allowed. Finally, the remaining living polymer chains were terminated by using isopropanol. Properties and characteristics of the polymer formed under the conditions of Example 36 are set out in Table 2.

TABLE 2

Synthesis of radial multi-block copolymers by simultaneous polymerization

| Rubber No. | Styrene monomer [%] | p-methyl styrene monomer [%] | 1,3-butadiene monomer [%] | Molar ratio TEA:Li | Molecular structure | Linear Mp [g/mol] | Mn [g/mol] | Coupled Mp [g/mol] | PDI | Ave. Arms | Coup. Effic. [%] |
|---|---|---|---|---|---|---|---|---|---|---|---|
| 24 | 22 | 8 | 70 | 4.5:1 | (BA1A2B)nZ | 111700 | 563300 | 768700 | 2.00 | 6.9 | 79.3 |
| 25 | 22 | 8 | 70 | 3.0:1 | (BA1A2B)nZ | 107000 | 553500 | 563900 | 1.57 | 5.3 | 91.0 |
| 26 | 22 | 8 | 70 | 2.0.1 | (BA1A2B)nZ | 103700 | 246800 | 707200 | 2.15 | 6.8 | 76.5 |

TABLE 2-continued

Synthesis of radial multi-block copolymers by simultaneous polymerization

| | | | | | | | | | | | |
|---|---|---|---|---|---|---|---|---|---|---|---|
| 27 | 22 | 8 | 70 | 1.0:1 | (BA1A2B)nZ | 100400 | 166900 | 914900 | 2.69 | 9.1 | 56.7 |
| 28 | 22 | 8 | 70 | 0.0:1 | (BA1A2B)nZ | 111700 | 225700 | 739000 | 2.18 | 6.6 | 70.0 |
| 29 | 22 | 8 | 70 | 0.0:1 | (BA1A2B)nZ | 100300 | 183800 | 891400 | 2.73 | 8.9 | 58.0 |
| 30 | 30 | 0 | 70 | 4.5:1 | (BA1B)nZ | 122500 | 339700 | 770600 | 1.83 | 6.3 | 82.4 |
| 31 | 30 | 0 | 70 | 3.0:1 | (BA1B)nZ | 114500 | 318600 | 768700 | 1.86 | 6.7 | 82.3 |
| 32 | 30 | 0 | 70 | 3.0:1 | (BA1B)nZ | 101900 | 343000 | 570200 | 1.63 | 5.6 | 90.0 |
| 33 | 30 | 0 | 70 | 2.0:1 | (BA1B)nZ | 115600 | 298500 | 737600 | 1.95 | 6.4 | 79.8 |
| 34 | 30 | 0 | 70 | 0.0:1 | (BA1B)nZ | 109500 | 180300 | 1057200 | 2.97 | 9.7 | 51.4 |
| 35 | 15 | 15 | 70 | 3.0:1 | (BA1A2B)nZ | 112800 | 552700 | 675300 | 1.89 | 6.0 | 80.6 |
| 36-ref2 | 30 | 0 | 70 | 1.0:1 | (BAB)nZ | 106600 | 136800 | 335900 | 1.47 | 3.2 | 40.8 |

| Rubber No. | n = 1 [%] | n = 2 [%] | n = 3 [%] | n = 4 [%] | n = 5+ [%] | MFI [g/10 min] | Cement viscosity [cPs] | Yell. Tint in Polymer Cement |
|---|---|---|---|---|---|---|---|---|
| 24 | 20.7 | 2.4 | 4.1 | 6 | 66.8 | 0.0427 | 1560 | N |
| 25 | 9.0 | 3.1 | 9.4 | 14.7 | 63.8 | 0.1500 | 1500 | N |
| 26 | 23.5 | 2.8 | 4.8 | 5.9 | 63.0 | 0.2960 | 760 | Y |
| 27 | 43.3 | 2.9 | 3.1 | 2.4 | 48.3 | 0.1615 | 736 | Y |
| 28 | 30.0 | 3.0 | 5.9 | 6.9 | 54.2 | 1.9325 | 340 | Y |
| 29 | 42.0 | 1.8 | 3.6 | 3.8 | 48.8 | 5.2000 | 220 | Y |
| 30 | 17.6 | 1.8 | 4.4 | 7.3 | 68.9 | 10.4500 | 1080 | N |
| 31 | 17.7 | 1.1 | 4.1 | 6.8 | 70.3 | 0.0202 | 1600 | N |
| 32 | 10.0 | 2.3 | 8.3 | 13.2 | 66.2 | 0.1900 | 1000 | N |
| 33 | 20.2 | 2.2 | 4.4 | 6.9 | 66.3 | 0.0787 | 968 | N |
| 34 | 48.6 | 3.1 | 3.7 | 2.1 | 42.5 | 0.9435 | 420 | Y |
| 35 | 19.4 | 3.0 | 5.5 | 8.2 | 63.9 | 0.1865 | 1060 | N |
| 36-ref2 | 59.2 | 3.0 | 15.3 | 15.6 | 6.9 | 3.6682 | 240 | Y |

Data of the copolymers synthesized by sequential polymerization are summarized in Table 1 and the copolymers synthesized by simultaneous polymerization are summarized in Table 2. In Tables 1 and 2, the results are summarized that were obtained for the peak molecular weight, Mp, of precursor linear multi-block copolymers $A_1A_2B$ or $BA_1A_2B$, the Mn and Mp of radial multi-block copolymers $(A_1B)_nZ$, $(A_1A_2B)_nZ$, $(BA_1B)_nZ$, $(BA_1A_2B)_nZ$, polydispersity index PDI, average number of arms per radial multi-block copolymer, percentage of coupling efficiency (coup. effic.), the melt flow index (MFI), the cement viscosity, and whether there is a yellow tint (yell. tint) in the polymer cement. The molecular weights, PDI, number of arms, and coupling efficiency of copolymer are determined by gel permeation chromatography (GPC, ASTM D3536) and yellowness is a visual observation. When yellowness is avoided, the polymer cement is clear (colorless) and transparent. Final number-average molecular weights, $M_n$, and peak molecular weight, $M_p$, are provided in Tables 1 and 2, and $M_p$ was used to calculate the number of arms as $M_p$ of the radial block copolymer/$M_p$ of the linear remaining block copolymer. The melt flow index, MFI, was measured according to ASTM D1238 (200° C. and 5 kg of load). Cement viscosity of rubber was determined by using a Brookfield viscometer at 20° C. according to the ASTM D1084. Samples of rubber solutions were previously prepared by adjusting the solid content to about 15 wt % using the same preferred solvent for reacting monomers (cyclohexane). Examples 1-23 were prepared with p-methylstyrene monomer, and Examples 24-36 were prepared with p-tertbutylstyrene monomer as the monovinylarene monomer other than styrene monomer.

In Table 1, the examples 1-11 can be employed to see the effect of molar ratio of TEA:Lithium between 0:1 to 4.5:1 for the $(A_1A_2B)_nZ$ molecular architecture. Examples 12-19 can be used to see the effect of molar ratio of TEA:Lithium between 0:1 to 4.5:1 for the $(A_1B)_nZ$ molecular architecture. Examples 1 and 12, 5 and 14, 7 and 16, 9 and 17, and 11 and 18 can be used to compare both $(A_1A_2B)_nZ$ and $(A_1B)_nZ$ molecular architecture for the different molar ratio of TEA:Lithium used. Examples 14, 5 and 20 can be used to see the effect of the amount of the monovinylarene monomer other than styrene monomer at a fixed monovinylarene monomer to conjugated diene monomer ratio. Examples 21, 5 and 22 can be used to observe the effect of the amount of the monovinylarene monomer other than styrene monomer while the monovinylarene monomer to conjugated diene monomer ratio is changed. Example 23 was made as a reference according to U.S. Pat. No. 7,009,000 to highlight the differences.

In Table 2, the examples 24-29 can be employed to see the effect of molar ratio of TEA:Lithium between 0:1 to 4.5:1 for the (BA1A2B)nZ molecular architecture. Examples 30-34 can be used to see the effect of molar ratio of TEA:Lithium between 0:1 to 4.5:1 for the (BA1B)nZ molecular architecture. Examples 23 and 30, 25 and 33, and 27 and 34 can be used to compare both (BA1A2B)nZ and (BA1B)nZ molecular architecture for the different molar ratio of TEA:Lithium used. Examples 31 and 35 can be used to see the effect of the amount of the monovinylarene monomer other than styrene monomer at a fixed monovinylarene monomer to conjugated diene monomer ratio. Example 36 was made as a reference according to U.S. Pat. No. 7,009,000 to highlight the differences.

As seen in Tables 1 and 2, a polyester used as a coupling agent that has several functional groups can react with the carbanion of the copolymer chain in anionic polymerization, so when a metal alkyl compound is added (i.e. triethyl aluminum compound), the coupling efficiency increases as reported in previous art. However, control of viscosity is difficult to obtain because of an increase in molecular weight of the radial block copolymer. In the present invention, the inventors got unexpected results when the molar ratio of TEA:Lithium was used above 1.6:1, using an amount of monovinylarene monomer other than styrene, and using a coupling agent selected from polyesters, polyacrylates, polymethacrylates, polyketones and similar compounds; for example, in any analyzed molecular architecture in this invention, the melt flow index decreases because of the growth of molecular weight of the radial multi-block copolymer as expected, but the viscosity of the rubber in solution tion. PSA performances are shown in Table 3 against unmodified rubber controls H and M and against prior art Q from examples 11, 18 and 23-ref1, respectively.

TABLE 3

Performance of Pressure-sensitive adhesive

| PMA/ Rubber No. | Styrene monomer [wt %] | p-methyl styrene monomer [%] | 1,3-butadiene monomer [%] | Molar ratio TEA:Li | Molecular architecture | Viscosity @ 150° C. [Pa-s] | RBSP [° C.] | Loop-Tack [kg/cm$^2$] | Peel strength [Kg/cm] | Tensile strength [Kg/cm$^2$] |
|---|---|---|---|---|---|---|---|---|---|---|
| A/1 | 22.0 | 8.0 | 70 | 4.5:1 | (A1A2B)nZ | 7.0 | 83.0 | 0.49 | 1.22 | 19.45 |
| B/3 | 22.0 | 8.0 | 70 | 4.0:1 | (A1A2B)nZ | 15.2 | 82.0 | 0.34 | 1.02 | 23.50 |
| C/4 | 22.0 | 8.0 | 70 | 3.5:1 | (A1A2B)nZ | 39.2 | 86.5 | 0.56 | 1.00 | 30.50 |
| D/5 | 22.0 | 8.0 | 70 | 3.0:1 | (A1A2B)nZ | 18.2 | 84.0 | 0.45 | 1.09 | 21.75 |
| E/6 | 22.0 | 8.0 | 70 | 2.5:1 | (A1A2B)nZ | 16.0 | 81.5 | 0.39 | 0.96 | 23.00 |
| F/7 | 22.0 | 8.0 | 70 | 2.0:1 | (A1A2B)nZ | 14.8 | 83.0 | 0.51 | 1.06 | 27.50 |
| G/9 | 22.0 | 8.0 | 70 | 1.0:1 | (A1A2B)nZ | 10.0 | 81.0 | 0.51 | 1.00 | 18.70 |
| H/11 | 22.0 | 8.0 | 70 | 0.0:1 | (A1A2B)nZ | 10.4 | 74.5 | 0.56 | 1.13 | 11.00 |
| I/12 | 30.0 | 0.0 | 70 | 4.5:1 | (A1B)nZ | 4.8 | 86.0 | 0.50 | 1.10 | 23.80 |
| J/14 | 30.0 | 0.0 | 70 | 3.0:1 | (A1B)nZ | 16.8 | 93.0 | 0.45 | 0.83 | 21.50 |
| K/16 | 30.0 | 0.0 | 70 | 2.0:1 | (A1B)nZ | 14.8 | 86.5 | 0.50 | 0.85 | 20.50 |
| L/17 | 30.0 | 0.0 | 70 | 1.0:1 | (A1B)nZ | 12.4 | 87.5 | 0.54 | 0.87 | 20.80 |
| M/18 | 30.0 | 0.0 | 70 | 0.0:1 | (A1B)nZ | 8.8 | 81.0 | 0.52 | 0.96 | 14.90 |
| N/20 | 15.0 | 15.0 | 70 | 3.0:1 | (A1A2B)nZ | 13.0 | 86.5 | 0.60 | 1.09 | 13.30 |
| O/21 | 29.2 | 10.8 | 60 | 3.0:1 | (A1A2B)nZ | 8.8 | 95.5 | 0.65 | 1.49 | 23.90 |
| P/22 | 14.6 | 5.4 | 80 | 3.0:1 | (A1A2B)nZ | 7.6 | 75.0 | 0.49 | 1.04 | 9.40 |
| Q/23-ref1 | 30.0 | 0.0 | 70 | 1.0:1 | (AB)nZ | 4.4 | 84.0 | 0.70 | 1.28 | 6.20 |

(cyclohexane) increases slightly, and more surprising results are the slight effect on viscosity for pressure-sensitive adhesives, PSAs, and for polymer-modified asphalts, PMAs as shown in Tables 3 and 4. A greater increase in viscosity for the PSAs and PMAs would have been expected, and the modest increase in viscosity was unexpected.

The inventors thus obtained a high coupling efficiency for molecular architectures and compositions according to the present invention. MFIs are lower in some cases than references, and cement viscosity is higher for all examples than for the references. In all examples, yellowness disappears at molar ratio of TEA:Lithium higher than 2:1.

Example 37

Applications in Pressure-Sensitive Adhesives (PSA)

Dry crumb, radial multi-block copolymers prepared in Examples 7 to 12 were used to make corresponding pressure-sensitive adhesive (PSA) formulations A to F. The adhesive formulation was prepared by mixing at 180° C. in a propeller mixer operating at 300 RPM, 23 wt % of a naphthenic plasticizer, 51 wt % of a terpene/styrenic resin, 2 wt % of a stabilizer system such as phenolic hindered antioxidants and phosphate-derived antioxidants, and 24 wt % of the radial multi-block copolymer. Finally, the adhesive formulation was mixed for 120 minutes to achieve homogeneity. The resulting PSA was cooled to room temperature, and test specimens were prepared according to test conditions.

The performance of the adhesive formulations was evaluated through Brookfield's viscosity test (ASTM D1084 at 150° C.), ring and ball softening point (ASTM D36), loop-tack (ASTM D6195), peel strength (ASTM D903), and tensile strength (modified ASTM D3759). Tensile test was measured by using 10 cm long and 1 cm$^2$ cross-section test specimens of the adhesive formulations. The specimens were subjected to an axial tensile force in a Zwick model 1445 universal mechanical machine at a constant strain rate of 508 mm/minute until the test specimen was broken. Tensile data (resistance at break) are reported for each adhesive formulation.

Hot-melt adhesives are solvent-free and are included in the family of pressure-sensitive adhesives (PSA). They are solid at temperatures below 80° C., are low viscosity fluids above 80° C., and rapidly set upon cooling. It is important to control viscosity of the PSA to process or to apply them properly. Usually, holt-melt adhesives can be applied by spraying them when viscosity has values between 1 and 70 Pa-s at 150° C.

Radial multi-block copolymers of the present invention were used to formulate pressure sensitive adhesives under the same adhesive composition. In Table 3, PSA performances are summarized. PSA samples A-H vary the molar ratio of TEA:Lithium for the $(A_1A_2B)_nZ$ architecture. It was surprisingly found that as the molar ratio of TEA:Lithium increases up to about 3.5:1, the viscosity increases but then decreases as the ratio is further increased to 4:1 and to 4.5:1. The same trend is observed for the $(A_1B)_nZ$ architecture as seen in the PSA samples I-M. PSA samples J, D and N show the effect on viscosity as function of the amount of the monovinylarene monomer other than styrene monomer at a fixed TEA:Lithium ratio. PSA viscosity surprisingly decreased when the content of the monovinylarene monomer other than styrene was above 8 wt %. PSA samples O, D and P show the effect of the amount of the monovinylarene monomer other than styrene monomer while the ratio of monovinylarene monomer to conjugated diene monomer changes. Then, for the monovinylarene monomer to conjugated diene monomer of 40/60 and 20/80, viscosity is low at around 8 Pa-s, and for the 30/70, viscosity increases to around 18 Pa-s. Therefore, in the present invention, the inventors surprisingly found that viscosity can be controlled by varying the molecular architecture, the molar ratio of TEA:Lithium, the amount of the monovinylarene monomer other than styrene monomer, and the type and amount of coupling agent.

Example 38

Applications in Polymer-Modified Asphalt (PMA)

Dry, gel-free radial multi-block copolymer of Examples 1-10 were used to prepare polymer-modified asphalt (PMA)

for road paving applications. For this purpose, an AC-20 asphalt from the Salamanca refinery in Mexico (PG 64-22, coded in agreement to AASHTO designation TP 5 "Test Method for Determining Rheological Properties of Asphalt Binder using a Dynamic Shear Rheometer (DSR)") was used to prepare the PMA by a hot-mix process. A high-shear mixer configured as rotor-stator (Euromix 33/300P) was employed. 96.5 wt % of neat AC-20 asphalt was heated without agitation at 120° C. under an inert atmosphere (nitrogen gas), and after softening the asphalt, a slow agitation was used to prevent asphalt overheating and oxidation. Then, temperature was increased to 185° C.±5° C., the agitation speed was fixed at 2,000 RPM, and 3.5 wt % of radial multi-block copolymer was added to the asphalt at a rate of 2 grams/minute. The residence time at these conditions was around 60 minutes to guarantee complete polymer dispersion.

The polymer-modified asphalts were characterized by ring and ball softening point test (RBSP) according to ASTM D36, penetration test at 25° C. (penet, ASTM D5) by using a Humboldt model H1200 penetrometer, Brookfield viscosity, BV, at 160° C. and 20 RPM according to ASTM D1084, a rutting factor, which was measured in a TA-Instruments model AR2000 rheometer using a 25 mm plate-plate geometry, and performance grade temperature (PG), which was determined when the rutting factor became 1.0 kPa as described in AASHTO designation TP5. Rutting factor, RF=G*/sin(delta). When G*/sin(delta)=1 kPa, the temperature, in Celcius, is the PG value. AASHTO is an acronym for the American Association of State Highway and Transportation Officials, which approves standard tests for asphalt specifications. Rutting factor, RF, G*/sin(delta), is determined by viscoelastic properties G', G" and tan(delta) as a function of temperature under a constant frequency of 10 rad/s and a small strain in the linear viscoelastic region (around 0.1%) at different temperature in the temperature range between 52 and 100° C. AASHTO recommends a dynamic strain rheometer and a parallel plate geometry (25 cm in diameter). Phase segregation process was made in an oven at 165° C. using cylindrical test samples. The samples were put in a vertical position without agitation. After 48 hours, the samples were quenched and cut in three equal sections. The middle section was neglected, and the top and bottom sections were examined by a low-amplitude oscillation rheological test. This test was made by using a TA-Instruments model AR2000 rheometer by means of a 25 mm plate-plate geometry, and applying to the sample 0.1% strain and 10 rad/s at 25° C. in order to determine the complex module G* for each of the top and bottom sections of the samples. After that, a rheological stability index (RSI) was calculated as follow:

$$RSI = \log(G^*_{bottom}/G^*_{top})$$

A PMA with no phase segregation is when RSI is equal to zero, and for a PMA with poor polymer stability, the RSI tends to increase. Results of performance of polymer-modified asphalt are given in Table 4.

TABLE 4

Performance of Polymer-Modified Asphalt

| PMA/ Rubber No. | p-methyl styrene monomer [%] | Styrene monomer [%] | Molar ratio TEA:Li | Molecular architecture | RBSP [° C.] | Penetration @ 25° C. [mm/10] | Brookfield Viscosity @ 160° C. [Pa-s] | PG [° C.] | Δ G* [Pa] | RSI |
|---|---|---|---|---|---|---|---|---|---|---|
| A/2 | 8.0 | 22.0 | 4.5:1 | (A1A2B)nZ | 54.0 | 48 | 0.612 | 74 | 748400 | 0.58 |
| B/8 | 8.0 | 22.0 | 2.0:1 | (A1A2B)nZ | 57.0 | 49 | 0.600 | 74 | 774300 | 0.88 |
| C/10 | 8.0 | 22.0 | 1.0:1 | (A1A2B)nZ | 57.0 | 52 | 0.679 | 73 | 1033800 | 1.05 |
| D/13 | 0.0 | 30.0 | 4.5:1 | (A1B)nZ | 54.0 | 53 | 0.562 | 74 | 8871400 | 1.88 |
| E/15 | 0.0 | 30.0 | 3.0:1 | (A1B)nZ | 58.0 | 52 | 0.612 | 74 | 845200 | 0.67 |
| F/19 | 0.0 | 30.0 | 0.0:1 | (A1B)nZ | 55.0 | 58 | 0.625 | 72 | 159500 | 0.16 |
| G/24 | 8.0 | 30.0 | 4.5:1 | (BA1A2B)nZ | 63.5 | 49 | 0.750 | 80 | 1796640 | 1.50 |
| H/25 | 8.0 | 30.0 | 3.0:1 | (BA1A2B)nZ | 58.0 | 48 | 0.912 | 79 | 2545560 | 1.60 |
| I/26 | 8.0 | 30.0 | 2.0:1 | (BA1A2B)nZ | 65.0 | 53 | 0.844 | 75 | 1584220 | 1.57 |
| J/27 | 8.0 | 30.0 | 1.0:1 | (BA1A2B)nZ | 63.5 | 52 | 0.904 | 76 | 1064060 | 1.35 |
| K/28 | 8.0 | 30.0 | 0.0:1 | (BA1A2B)nZ | 63.0 | 59 | 0.871 | 73 | 1351300 | 1.05 |
| L/29 | 8.0 | 30.0 | 0.0:1 | (BA1A2B)nZ | 56.0 | 56 | 0.662 | 74 | 1837130 | 1.38 |
| M/30 | 0.0 | 30.0 | 4.5:1 | (BA1B)nZ | 64.5 | 52 | 0.942 | 76 | 1391250 | 1.28 |
| N/31 | 0.0 | 30.0 | 3.0:1 | (BA1B)nZ | 65.0 | 53 | 0.792 | 76 | 1571500 | 1.15 |
| O/32 | 0.0 | 30.0 | 3.0:1 | (BA1B)nZ | 57.0 | 44 | 0.825 | 78 | 2267640 | 1.53 |
| P/33 | 0.0 | 30.0 | 2.0:1 | (BA1B)nZ | 70.0 | 50 | 0.758 | 76 | 1806540 | 1.67 |
| Q/34 | 0.0 | 30.0 | 0.0:1 | (BA1B)nZ | 64.0 | 56 | 0.692 | 75 | 1437600 | 1.08 |
| R/35 | 15.0 | 30.0 | 3.0:1 | (BA1A2B)nZ | 65.5 | 44 | 0.708 | 76 | 1222370 | 1.21 |
| S/36-ref2 | 0.0 | 30.0 | 1.0:1 | (BA)nZ | 60.0 | 50 | 0.725 | 76 | 1741010 | 1.28 |

| PMA/ Rubber No. | RF 52° C. [kPa] | RF 58° C. [kPa] | RF 64° C. [kPa] | RF 70° C. [kPa] | RF 76° C. [kPa] | RF 82° C. [kPa] | RF 88° C. [kPa] | RF 94° C. [kPa] |
|---|---|---|---|---|---|---|---|---|
| A/2 | 13.32 | 6.176 | 3.030 | 1.481 | 0.7420 | 0.3996 | 0.2281 | 0.1359 |
| B/8 | 15.00 | 7.078 | 3.431 | 1.650 | 0.8317 | 0.4365 | 0.2459 | 0.1455 |
| C/10 | 17.06 | 8.049 | 3.925 | 1.976 | 1.099 | 0.6344 | 0.3944 | 0.2571 |
| D/13 | 11.82 | 5.780 | 2.798 | 1.408 | 0.7135 | 0.3721 | 0.2068 | 0.1237 |
| E/15 | 13.16 | 6.537 | 3.164 | 1.646 | 0.8245 | 0.4660 | 0.2703 | 0.1690 |
| F/19 | 10.31 | 5.045 | 2.269 | 1.230 | 0.6617 | 0.3681 | 0.2141 | 0.1316 |
| G/24 | 19.46 | 9.941 | 5.187 | 2.740 | 1.468 | 0.8505 | 0.5103 | 0.3137 |
| H/25 | 21.58 | 10.34 | 5.502 | 2.531 | 1.411 | 0.7393 | 0.4300 | 0.2595 |
| I/26 | 12.83 | 6.190 | 3.207 | 1.667 | 0.9021 | 0.5171 | 0.3367 | 0.1990 |
| J/27 | 13.83 | 7.000 | 3.451 | 1.840 | 1.0200 | 0.5688 | 0.3314 | 0.2033 |
| K/28 | 9.940 | 5.127 | 2.631 | 1.308 | 0.7589 | 0.4402 | 0.2725 | 0.1720 |
| L/29 | 15.49 | 7.479 | 3.619 | 1.785 | 0.9131 | 0.5085 | 0.2938 | 0.1783 |
| M/30 | 14.35 | 6.291 | 3.554 | 1.899 | 1.041 | 0.5891 | 0.3523 | 0.2164 |

TABLE 4-continued

| Performance of Polymer-Modified Asphalt | | | | | | | | |
|---|---|---|---|---|---|---|---|---|
| N/31 | 12.61 | 6.382 | 3.316 | 1.729 | 0.9742 | 0.5588 | 0.3354 | 0.2052 |
| O/32 | 18.52 | 9.695 | 4.835 | 2.491 | 1.2940 | 0.7190 | 0.4209 | 0.2539 |
| P/33 | 12.38 | 6.183 | 3.212 | 1.703 | 0.9584 | 0.5648 | 0.3383 | 0.2074 |
| Q/34 | 11.52 | 5.787 | 2.963 | 1.611 | 0.9024 | 0.5227 | 0.3144 | 0.1887 |
| R/35 | 14.79 | 7.138 | 3.546 | 1.887 | 1.0030 | 0.5513 | 0.3308 | 0.2108 |
| S/36-ref2 | 13.29 | 6.481 | 3.482 | 1.788 | 0.9923 | 0.5710 | 0.3367 | 0.1990 |

Different molecular architectures are considered in the examples for polymer-modified asphalts as shown in Table 4. Mechanical properties in both $(A_1A_2B)nZ$ and $(A_1B)nZ$ molecular architectures have similar trends, as seen in samples A, B, and C and in samples D, E and F, respectively. Ring and ball softening point remains at about the same value of around 56° C., penetration shows a slightly decrease, and performance grade, PG, shows a slight increase. Brookfield's viscosity surprisingly decreases as molar ratio of TEA: Lithium increases for samples D-F. Rheological stability index, RSI, is a function of the molecular architecture, and for the $(A_1B)nZ$ architecture, the RSI increases significantly as the molar ratio of TEA:Li increase (see PMA D, E and F). Unexpected results were found when a monovinylarene monomer other than styrene monomer is used. Sample H has 8 wt % p-methyl styrene monomer and a Brookfield viscosity of 0.912 Pa-s, while sample R has 15 wt % p-methyl styrene monomer and a Brookfield viscosity of 0.708 Pa-s at the same TEA:LI ratio of 3:1, which was a surprising decrease in viscosity as the non-styrene monomer was increased. For the $(A_1A_2B)nZ$ architecture, RSI decreases as the molar ratio of TEA:Li increases, which improves the stability between the polymer and the asphalt phases. Rutting factor at different temperatures shows similar values at all the molar ratio of TEA:Lithium range.

Mechanical properties in both $(BA_1A_2B)nZ$ and $(BA_1B)nZ$ molecular architectures can be seen in Table 4, where they have similar trends in penetration at 25° C., ring and ball softening point, RBSP, and rutting factor at different temperatures when molar ratio of TEA:Lithium increases. Rheological stability index, RSI, is also a function of molecular architecture. When $(BA_1B)nZ$ molecular architecture is used, the RSI shows similar values at all the molar ratio of TEA:Lithium range, but surprisingly, for $(BA_1A_2B)nZ$, the RSI increases up to the molar ratio of TEA:Lithium of 2.5:1, after that the RSI remains similar, and this means the stability between polymer and asphalt phases is in control.

Having described the invention above, various modifications of the techniques, procedures, materials, and equipment, as well as substitutes for some of the components, will be apparent to those skilled in the art. It is intended that all such variations within the scope and spirit of the invention be included within the scope of the appended claims.

What is claimed is:

1. A process for making a radial multi-block copolymer, comprising the steps of:
    (a) anionically polymerizing styrene monomer $A_1$, p-methylstyrene and/or p-tertbutylstyrene monomer $A_2$ and 1,3-butadiene and/or isoprene monomer $B_1$ using a lithium-based initiator to form block copolymer chains, wherein the monomers $A_1$, $A_2$, and $B_1$ are polymerized simultaneously or in any sequential order;
    (b) adding an alkyl aluminum compound after initiating anionic polymerization in step (a) and before reaching peak reaction temperature in step (a), wherein the molar ratio of the alkyl aluminum compound to lithium ranges from 2:1 to 5:1, wherein a polymerization system is used in steps (a) and (b), and wherein the polymerization system may or may not include a tertiary amine and/or an ether compound but otherwise consists of the lithium-based initiator and the alkyl aluminum compound for promoting a coupling reaction; and
    (c) adding a coupling agent to form the radial multi-block copolymer, wherein the coupling agent is a polyester, polyacrylate, polymethacrylate or a polyketone compound, and wherein the radial multi-block copolymer comprises a residue Z derived from the coupling agent and block copolymer chains from step (b) coupled to the residue Z.

2. The process of claim 1, wherein the weight percent of the radial multi-block copolymer having at least five block copolymer chains attached to the residue Z is at least about 40.

3. The process of claim 1, wherein the alkyl aluminum compound is triethylaluminum, and wherein the coupling agent is poly(2-ethyl-hexyl-acrylate).

4. The process of claim 1, wherein the coupling efficiency is at least about 70 percent.

5. The process of claim 1, wherein the radial multi-block copolymer has the structure $(B_1A_1A_2)_nZ$ and/or $(A_1A_2B_1)_nZ$, where n is the number of block copolymer chains coupled to the coupling agent residue Z, and wherein the molar ratio of the alkyl aluminum compound to lithium is about 3.0.

6. The process of claim 1, wherein the amount of monomer $A_2$ is from about 0.5 wt % to about 30 wt % of the total amount of $A_1$ and $A_2$.

7. The process of claim 1, wherein the amount of monomer $A_2$ is from about 2 wt % to about 15 wt % of the total amount of $A_1$ and $A_2$.

8. The process of claim 7, wherein the initiator is an organolithium compound selected from the group consisting of n-butyllithium and sec-butyllithium.

9. The process of claim 1, wherein the molar ratio of alkyl aluminum compound to radial multi-block copolymer ranges from 2.5:1 to 4.5:1.

10. The process of claim 9, wherein the alkyl aluminum compound is triethylaluminum.

11. The process of claim 1, further comprising anionically polymerizing a conjugated diene monomer $B_2$ with the block copolymer chains from step (a) after the metal alkyl compound is added and before the coupling agent is added, and wherein $B_2$ may or may not be the same as $B_1$.

12. The process of claim 1, wherein the amount of the monomer $A_2$ is from about 2 wt % to about 30 wt % of the $A_1$ and $A_2$ monomers, wherein the molar ratio of the alkyl aluminum compound to lithium ranges from 2.5:1 to 4.5:1, and wherein the coupling agent is poly(2-ethyl-hexyl acrylate).

13. The process of claim 1, further comprising adding a suitable asphalt for road or roofing applications to form a polymer-modified asphalt, wherein the polymer-modified asphalt contains from about 2 to about 20 wt % of the radial multi-block copolymer.

14. The process of claim 1, further comprising adding a different block copolymer, tackifying resins, extender oil, and a stabilizer system to form an adhesive composition, wherein the different block copolymer has a structure or composition that differs from the block copolymer chains formed in step (a).

15. The process of claim 1, further comprising hydrogenating the radial multi-block copolymer and mixing the hydrogenated radial multi-block copolymer with at least one engineering plastic.

16. The process of claim 1, wherein a radial multi-block polymer cement is formed after the coupling agent is added, further comprising steam stripping the radial multi-block polymer cement or dispersing the radial multi-block polymer cement in water and recovering the radial multi-block polymer cement as the radial multi-block copolymer.

17. The process of claim 1, wherein the radial multi-block copolymer does not have a yellow tint.

18. The process of claim 1, further comprising anionically polymerizing a conjugated diene monomer $B_2$ with the block copolymer chains from step (a) after the alkyl aluminum compound is added and before the coupling agent is added.

19. The process of claim 18, wherein arms are formed having the structure $(B_1A_1A_2B_2)$, wherein the radial multi-block copolymer has the structure $(B_1A_1A_2B_2)_nZ$, where n is the number of arms coupled to the coupling agent residue Z.

20. The process of claim 19, wherein the conjugated diene monomers $B_1$ and $B_2$ can be the same or different monomers, and wherein the conjugated diene monomer $B_2$ is selected from the group consisting of 1,3-butadiene and isoprene.

21. The process of claim 19, wherein the radial multi-block copolymer having the structure $(B_1A_1A_2B_2)_nZ$ comprises at least from about 10 wt % to about 90 wt % of monovinylarene monomer $(A_1+A_2)$ and at least from about 90 wt % to about 10 wt % of conjugated diene monomer $(B_1+B_2)$.

22. The process of claim 21, wherein the radial multi-block copolymer having the structure $(B_1A_1A_2B_2)_nZ$ comprises from about 8 wt % to about 60 wt % of vinyl units in the polydiene blocks $(B_1+B_2)$.

23. The process of claim 19, further comprising adding a suitable asphalt for road or roofing applications to form a polymer-modified asphalt, wherein the polymer-modified asphalt contains from about 2 to about 20 wt % of the radial multi-block copolymer.

24. The process of claim 19, further comprising adding a different block copolymer, tackifying resins, extender oil, and a stabilizer system to form an adhesive composition, wherein the different block copolymer has a structure or composition that differs from the block copolymer chains formed in step (a).

25. The process of claim 19, further comprising hydrogenating the radial multi-block copolymer and mixing the hydrogenated radial multi-block copolymer with at least one engineering plastic.

26. The process of claim 18, wherein a radial multi-block copolymer having the structure $(B_1A_1A_2B_2)_nZ$ is formed and has a number average molecular weight of from about 5,000 to about 500,000 g/mol.

27. The process of claim 26, wherein the $B_2$ block has a number average molecular weight of from about 500 to about 5,000 g/mol.

28. A process for producing a radial multi-block copolymer, comprising the steps of:
  (a) anionically polymerizing styrene monomer $A_1$ and p-methylstyrene and/or p-tertbutylstyrene monomer $A_2$ simultaneously or sequentially with a lithium-based initiator, wherein a block $A_1A_2$ is formed;
  (b) anionically polymerizing at least one conjugated diene monomer to form a block B, wherein a polymer chain having the structure $A_1A_2B$ and/or $BA_1A_2$ is formed having a polydienyllithium carbanion at the end of the polymer chain;
  (c) adding an alkyl aluminum compound after initiating the polymerization in step (b), wherein the molar ratio of the alkyl aluminum compound to lithium is at least 2.0, wherein a polymerization system is used in step (b), and wherein the polymerization system may or may not include a tertiary amine and/or an ether compound but otherwise consists of the lithium-based initiator and the alkyl aluminum compound for promoting a coupling reaction; and
  (d) adding a coupling agent, wherein a radial multi-block copolymer having the structure $(A_1A_2B)_nZ$ and/or $(A_2A_1B)_nZ$ is formed, wherein Z is a residue of the coupling agent, and wherein the coupling agent is a polyester, polyacrylate, polymethacrylate or a polyketone compound.

29. The process of claim 28, wherein the amount of monomer $A_2$ is from about 0.5 wt % to about 80 wt % of the total amount of $A_1A_2$.

30. The process of claim 29, wherein the molar ratio of the alkyl aluminum compound to lithium is no more than 5.0.

31. The process of claim 30, wherein the conjugated diene monomer B is 1,3-butadiene or isoprene, and wherein the initiator is n-butyllithium or sec-butyllithium.

32. The process of claim 31, wherein the radial multi-block copolymer has a number average molecular weight of from about 5,000 to about 400,000 g/mol.

33. The process of claim 28, wherein the radial multi-block copolymer comprises from about 10 to about 90 wt % of $A_1$ and $A_2$ monomers and from about 90 wt % to about 10 wt % of conjugated diene monomers.

34. The process of claim 33, wherein the radial multi-block copolymer comprises from about 8 wt % to about 60 wt % of vinyl units in the polydiene block.

35. The process of claim 28, wherein the weight percent of the radial multi-block copolymer having at least five block copolymer chains attached to the residue Z is at least about 40.

36. The process of claim 28, wherein the radial multi-block copolymer does not have a yellow tint.

37. The process of claim 36, wherein the coupling efficiency is at least about 70 percent.

38. The process of claim 37, wherein the molar ratio of the alkyl aluminum compound to lithium is about 3.0.

39. The process of claim 28, wherein the molar ratio of the alkyl aluminum compound to lithium is about 3.0.

40. The process of claim 39, wherein the coupling agent is poly(2-ethyl-hexyl-acrylate).

41. The process of claim 28, wherein the alkyl aluminum compound is triethylaluminum, and wherein the radial multi-block copolymer does not have a yellow tint.

42. The process of claim 28, further comprising hydrogenating the radial multi-block copolymer.

43. The process of claim 28, further comprising adding a suitable asphalt for road or roofing applications to form a polymer-modified asphalt, wherein the polymer-modified asphalt contains from about 2 to about 20 wt % of the radial multi-block copolymer.

44. The process of claim 28, further comprising adding a different block copolymer, tackifying resins, extender oil, and a stabilizer system to form an adhesive composition, wherein the different block copolymer has a structure or composition that differs from the polymer chain formed in step (b).

45. The process of claim 28, further comprising hydrogenating the radial multi-block copolymer and mixing the hydrogenated radial multi-block copolymer with at least one engineering plastic.

46. The process of claim 28, wherein a radial multi-block polymer cement is formed after the coupling agent is added, further comprising steam stripping the radial multi-block polymer cement or dispersing the radial multi-block polymer cement in water and recovering the radial multi-block polymer cement as the radial multi-block copolymer.

47. The process of claim 28, wherein the alkyl aluminum compound is added before a peak reaction temperature in step (b) is reached.

* * * * *